(12) United States Patent
Wong et al.

(10) Patent No.: US 12,373,046 B2
(45) Date of Patent: Jul. 29, 2025

(54) SYSTEM AND METHOD FOR RECOVERY AND COMPENSATION FOR DROPPED OR MISSED DATA PACKETS FOR COMMUNICATION BETWEEN A WIRELESS MOUSE AND A WIRELESS COMMUNICATION DONGLE

(71) Applicant: Dell Products, LP, Round Rock, TX (US)

(72) Inventors: Kai Leong Wong, Singapore (SG); Jui Chang Liu, New Taipei (TW); Karthikeyan Krishnakumar, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 63 days.

(21) Appl. No.: 18/229,552

(22) Filed: Aug. 2, 2023

(65) Prior Publication Data

US 2025/0044887 A1 Feb. 6, 2025

(51) Int. Cl.
*G06F 3/038* (2013.01)
*G06F 3/0354* (2013.01)
*G06F 13/38* (2006.01)

(52) U.S. Cl.
CPC .......... *G06F 3/038* (2013.01); *G06F 3/03543* (2013.01); *G06F 13/385* (2013.01); *G06F 2203/0384* (2013.01)

(58) Field of Classification Search
CPC .... G06F 3/03543; G06F 3/038; G06F 13/385; G06F 2203/0384
See application file for complete search history.

(56) References Cited

U.S. PATENT DOCUMENTS

| | | | |
|---|---|---|---|
| 7,801,099 B2 | 9/2010 | Desai | |
| 7,853,663 B2 | 12/2010 | Hoerl | |
| 8,364,080 B2 | 1/2013 | Desai | |
| 8,913,599 B2 | 12/2014 | Gonikberg | |
| 11,653,057 B2 | 5/2023 | Sudak | |
| 2021/0373678 A1* | 12/2021 | Chauvin | G06F 3/0383 |
| 2023/0305645 A1* | 9/2023 | Lee | G06F 3/03543 |

FOREIGN PATENT DOCUMENTS

EP 1841149 B1 11/2017

* cited by examiner

*Primary Examiner* — Eric T Oberly
(74) *Attorney, Agent, or Firm* — Prol Intellectual Property Law, PLLC; H. Kenneth Prol

(57) ABSTRACT

A wireless input/output (IO) device missed position offset value recovery and compensation system of a wireless communication dongle at an information handling system comprising a controller to transmit with a wireless radio system a polling packet to instruct a wireless mouse to transmit a selected number of data packets, each including a compressed two byte payload of wireless mouse position changes within a data packet frame, the wireless radio system to detect missing data packets within the data packet frame. The controller to translate the wireless mouse position offset values from received payloads into determined cursor positional data for a displayed cursor and to estimate cursor positional data for missing data packets based on wireless mouse position offset values in received payloads in the data packet frame, and the controller to communicate the received and estimated cursor positional data to an operating system of the information handling system.

20 Claims, 5 Drawing Sheets

SYSTEM AND METHOD FOR RECOVERY AND COMPENSATION FOR DROPPED OR MISSED DATA PACKETS FOR COMMUNICATION BETWEEN A WIRELESS MOUSE AND A WIRELESS COMMUNICATION DONGLE

FIELD OF THE DISCLOSURE

The present disclosure generally relates to wireless peripheral input/output (IO) devices, such as mice, gaming controllers, keyboards, earbuds, headphones, headsets, and virtually reality peripherals. More specifically, the present disclosure relates to a wireless communication from a wireless communication dongle or an information handling system, operating independently from the information handling system operating system (OS) for recovering or compensating for dropped or missed data packets providing positional information for a wireless peripheral IO device, such as a wireless mouse within data packet communication frames transmitted to a wireless communication dongle.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more wireless peripheral input/output devices such as a keyboard, mouse, touchpad, gaming controller, display device, wearable peripheral device, speakers, earbud, headphone, microphone, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
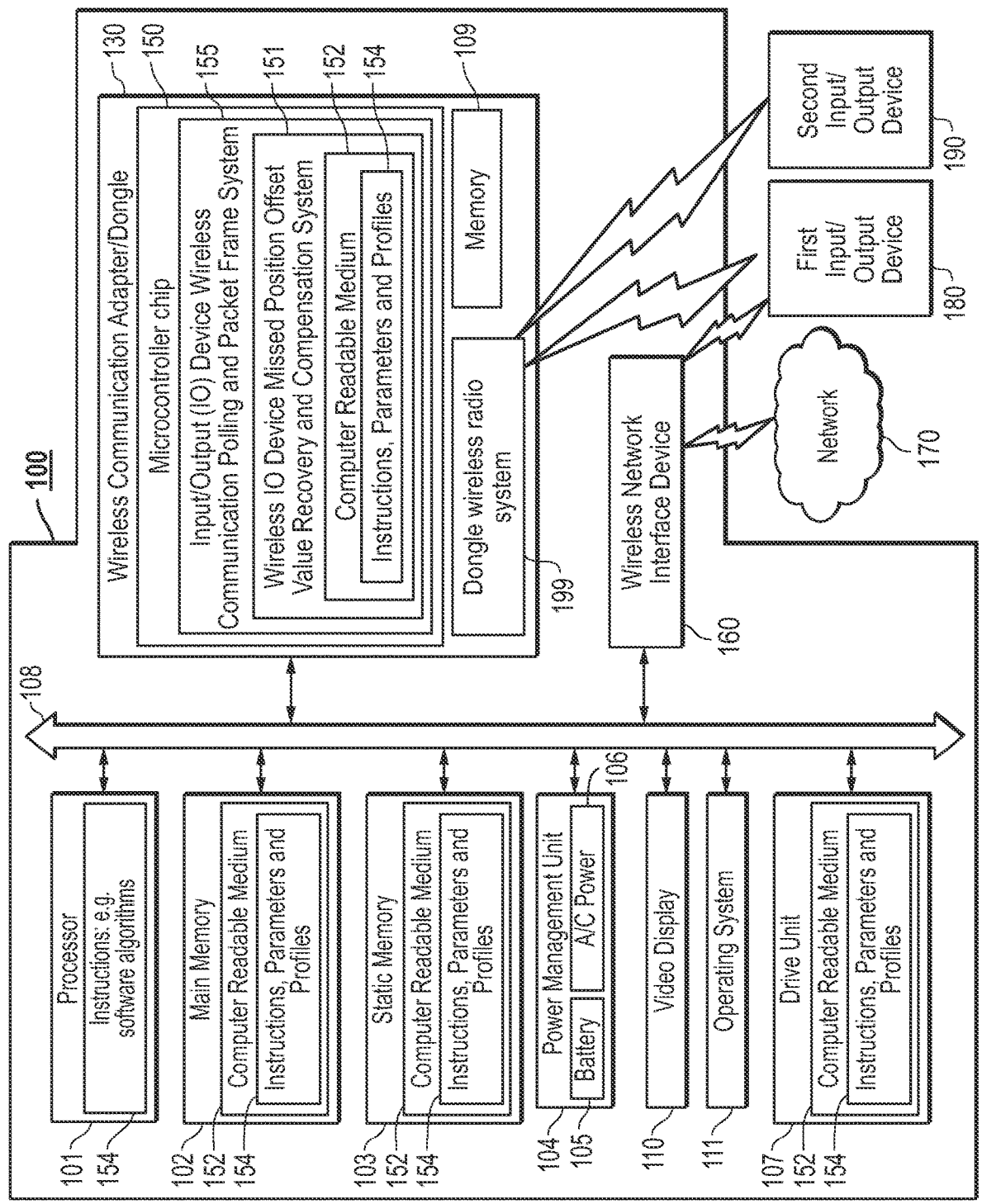
FIG. 1 is a block diagram illustrating an information handling system with a wireless radio system or operatively coupled to a wireless communication dongle orchestrating wireless communication via an input/output (IO) device wireless communication polling and packet frame system with recovery or compensation for dropped or missed positional offset values for one or more wireless IO devices according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Users of information handling systems such as smart phones, tablets, or laptops may employ a plurality of wireless peripheral input/output (IO) devices (e.g., mouse, keyboard, touchpad, gaming controller, earbuds, headphones, smart speakers, headsets including headphones and speakers, or virtual reality peripherals) located remotely from the information handling system to wirelessly transmit and receive IO data such as keystrokes, mouse positional data, or audiovisual information. Wireless peripheral IO devices are also referred to as wireless IO devices herein. Many existing systems employ a wireless communications dongle operably connected to the information handling system (e.g., desktop, laptop, or tablet computer) to pair with and communicate wirelessly with one or more of these wireless IO devices. In other embodiments, a wireless communication dongle may be integrated as part of the wireless radio adapter internal to the information handling system for pairing with and communicating wirelessly with one or more of these wireless IO devices. Many manufacturers of these wireless IO devices build these devices to provide the most basic or rudimentary communication capabilities that comply with the Bluetooth® Low Energy (BLE) communication standard.

For example, many existing wireless IO devices are designed to communicate with a wireless communications dongle using a one reception/one transmission (1RX/1TX) format that requires a wireless communications dongle to respond to every data packet received from a wireless IO device by transmitting an acknowledgment (ACK) data packet. In other words, each time the wireless communications dongle operating in receive mode receives a data packet, it must then switch to transmit mode and transmit an ACK data packet back to the wireless IO device from which the initial data packet was received. The wireless communications dongle may then switch back to a receive mode to receive the next data packet from the wireless IO device. This process may be repeated each time a new data packet is generated at the wireless IO device, for example. More specifically, in the case of a wireless mouse, this process may be repeated each time the wireless mouse determines the location of the mouse has changed, prompting a correlated change in the position of a cursor within a display device for the information handling system. Thus, this mode-switching may occur multiple times per second in some cases.

Each of these transmission/reception mode switches consumes power, and requires more airtime for acknowledgment (ACK) data packets acknowledging receipt of wireless IO device input data packets at the wireless radio system for the wireless communication dongle or information handling system. Such a 1RX/1TX system may be limited in data throughput, consume power unnecessarily for such transmit and receive switches during operations, and require a certain amount of spacing between transmission of multiple wireless IO device input data packets from the wireless IO device to the wireless communication dongle or information handling system in order to allow for transmission of an ACK data packet in between transmission of such multiple wireless IO device input data packets. Such systems may cause the customer to experience slow response from a wireless IO device, or a lag between their input via the wireless IO device (e.g., movement of the mouse) and the corresponding feedback displayed by the information handling system (e.g., movement of the cursor). As a result, existing systems employing this 1RX/1TX approach may fail to meet customer needs for wireless IO device report rates during execution of latency-sensitive software applications such as gaming applications or other high definition audio/visual applications.

Embodiments of the present disclosure employ a customized wireless IO device communication protocol by performing data modulation on wireless IO device data packets transceived using the BLE radio layer protocol in order to allow for transmission of a plurality of data packets in a data packet communication frame from the wireless IO device to the wireless radio system between polling packets having ACK data transmitted from the wireless radio system of the dongle to the wireless IO device.

A controller for a wireless radio system of a wireless communication dongle may execute code instructions, such as firmware, of an IO device wireless communication polling and packet frame system with recovery or compensation of missed position offset values for the wireless IO device according to embodiments of the present disclosure. In embodiments of the present disclosure, a wireless radio adapter, such as in a wireless communications dongle, may receive a request to connect from one or more wireless IO devices (e.g., mouse and gaming controller), and may respond by transmitting a polling packet that instructs each of the wireless IO devices paired with the wireless communications dongle to transmit a selected number of data packets of a selected packet length and at specified time slots during a first data packet communication frame between the wireless communications dongle and each of the paired wireless IO devices. The controller for a wireless radio system of a wireless communication dongle or information handling system in embodiments may orchestrate scheduled delivery of a selected number of data packets from each of one or more wireless IO devices in a data packet communication frame between delivery of ACK data packets in a next polling packet with instructions for a selected number of data packets and selected data packet length in allotted time slots to each of the one or more wireless IO devices in a next data packet communication frame.

The controller at the wireless communications dongle may ensure that, during the received data packet communication frame in which time slots have been allocated to the one or more wireless IO devices (e.g., mouse and gaming controller), the wireless radio system, such as in the wireless communication dongle, remains in a receive mode to receive a select number of wireless IO device input data packets from the one or more paired wireless IO devices in accordance with the selected number of packets prescribed and the duration (e.g., based on packet lengths) from each of the one or more wireless IO devices in the polling packet. Following receipt of the data packet communication frame at the end of a time period determined by the number of packets expected, packet lengths, and any spacing time, the controller of the wireless communications dongle or other wireless radio adapter may switch to transmit mode and transmit to each of the paired wireless IO devices an acknowledgement (ACK) as part of a next polling packet identifying the select number of packets and select data packet length to be received during the data packet communication frame from each of the paired wireless IO devices. Select number of data packets or select data packet lengths may be adjusted on the fly for any wireless IO device, such as during polling packets or even between polling packets in some embodiments of the present disclosure. Such an orchestrated delivery of a select number of wireless IO device input data packets within the data packet communication frame may allow for the transmission of a wireless IO device input data packet containing two positional measurements for a mouse up to every 0.000250 seconds (250 µs), or at a rate of 8,000 positional measurements per second in one example embodiment. Use of this orchestrated delivery method in embodiments of the present disclosure may allow the wireless IO device to transmit input data (e.g., positional information from a mouse or positional information of a gaming controller) at a high transmission report rate, and also to register that input data within the wireless IO device at a high sample rate. In other words, a wireless mouse or gaming controller may take positional measurements more frequently, or a keyboard may register keystrokes in smaller intervals.

Existing wireless IO devices transceive data packets adhering to the Universal Serial Bus (USB) Human Interface Device (HID) reporting formats for various types of devices that is not well-suited for these higher sample rates. For example, a wireless mouse or gaming controller may transceive positional information for the mouse or gaming controller according to the USB HID reporting format that requires the positional data to include a six byte description of an initial position and a six byte description of a next adjusted position for the mouse or the gaming controller console. However, positional data sampled in intervals less than 250-500 microseconds apart may be expressed by providing the initial position, along with a change in position, or position offset value away from this initial position instead. Such a change in position or position offset value may be expressed in two bytes, in comparison to the six bytes describing a next adjusted position. The IO device wireless communication polling and packet frame system of the present disclosure may orchestrate compression of wireless IO device input data packet payloads prior to transmission of those wireless IO device compressed input data packets and decompression of the payload from the wireless IO device compressed input data packets at a communication dongle or wireless radio of an information handling system to take advantage of these smaller data payload capabilities and improve wireless transmission performance such as dongle repot rates from a wireless mouse.

In embodiments of the present disclosure, the initial polling packet transmitted by the controller for the wireless communication dongle or information handling system may define a selected number of compressed input data packets (e.g., four) and a selected compressed data packet length (e.g., in bytes) that instructs the number and length of data packets the wireless IO device should transmit to the wireless communication dongle or information handling system during the next data packet communication session and that the data packets should be compressed according to type of wireless IO device. The wireless IO device (e.g., mouse or gaming controller) that receives this initial polling packet may use these selected packet number or selected packet length from within the initial polling packet to set a sample rate at which the wireless IO device (e.g., mouse) takes input (e.g., measures position of the mouse). For example, in an embodiment in which the initial polling packet instructs delivery of a wireless IO device compressed input data containing two mouse positional measurements every 250 μs (e.g., to give a transmission rate of 8,000 mouse positional measurements per second), the wireless IO device may set its sample rate to two samples per 250 μs, or one sample every 125 μs or less. In the case of a mouse, this indicates positional measurements taken every 125 μs.

Setting of such a high sample rate or selection within the initial polling packet of a shorter wireless IO device compressed input data length in embodiments of the present disclosure may prompt a microcontroller executing code instructions of an IO device wireless communication polling and packet frame agent to compress the wireless IO device input data detected at the wireless IO device prior to transmission of that wireless IO device input data as a payload of a wireless IO device compressed input data packet to the wireless communication dongle or information handling system. For example, the initial polling packet in embodiments may instruct transmission of four wireless IO device compressed input data packets in intervals of 250 μs or less, as a data packet communication frame with a total duration of less than 1,000 μs. Such wireless IO device compressed input data packets may include more than one payload, with each payload containing one positional measurement for a wireless mouse in some cases. A first wireless IO device compressed input data packet of a first data packet communication frame (e.g., initial transmission of data from the wireless IO device to the wireless communication dongle upon establishment of a wireless link) in embodiments of the present disclosure may include one or more payloads, each comprising a six byte initial position for the wireless IO device and a two byte position offset value indicating a change in the position of the wireless IO device from the initial position. In some embodiments, in later-transmitted wireless IO device compressed input data packets of the first data packet communication frame or of later data packet communication frames, the payload may omit the initial position and provide only the wireless IO device position offset value sampled by the wireless IO device during the most recent interval between transmitted wireless IO device compressed input data packets. These compressed expressions of positional measurement may decrease the size of the wireless IO device compressed input data containing these compressed positional measurements in comparison to the size of a wireless IO device input data packet containing positional measurement adhering to the USB HID format over plural positional data values transmitted for motion such as cursor motion, which may require a six byte initial position and a six byte updated position.

Upon receipt of such wireless IO device compressed input data packets at the wireless radio system for the wireless communication dongle or the information handling system along with header information identifying the type of wireless IO device, the controller for the wireless radio system in embodiments herein may retranslate the compressed wireless IO device input data into the USB HID format for that wireless IO device. For example, the controller for the wireless radio system in embodiments herein may retranslate the compressed wireless IO device input data containing a six byte initial position and two bytes of offset values into an HID formatted report containing the six byte initial position, and a six byte updated position determined by applying the two bytes of offset values to the initial position. In other embodiments, later-transmitted wireless IO device compressed input data packets of the first data packet communication frame or of later data packet communication frames omit the initial position and provide only the wireless IO device position offset value sampled by the wireless IO device during the most recent interval between transmitted wireless IO device compressed input data packets. In such an embodiment, the position of a cursor corresponding to the position of the wireless IO device (e.g., mouse) in a second packet of the first data packet communication frame in embodiments may be determined by applying the wireless IO device position offset within the first and second packets of that frame to the initial position given within the first packet of that frame. Similarly, the position for the cursor may be determined for each successively received wireless IO device compressed input data packet by applying the wireless IO device position offset value within the most recently received wireless IO device compressed input data packet and all of the previously received wireless IO device position offset values to the initial position given in the first packet of the first frame. The USB HID report generated in such a way to represent standard HID format for wireless IO device data may then be communicated to the operating system (OS) for the information handling system for processing of the uncompressed or reassembled input data for the wireless IO device. The OS of the information handling system may only operate with wireless IO Device data that is received in this USB HID format for example, thus requiring the reconversion.

As described directly above, the position for the cursor for each successively received wireless IO device compressed input data packet in some embodiments depends upon the wireless IO device position offset value within all of the wireless IO device compressed input data packets received previously. As such, any dropped packets or measured position offsets not received at the wireless communication dongle in embodiments may compromise the ability to determine the position of the wireless IO device following such a dropped packet or missed measurement. In embodiments in which each payload of a wireless IO device compressed input data packet contains an initial position in addition to position offsets, dropped packets may result in a decreased report rate. A system is needed to compensate for or recover missed wireless IO device position offset values associated with dropped packets and to attempt to avoid any future dropped packets.

Code instructions of the wireless IO device missed position offset value recovery and compensation system in embodiments of the present disclosure address these issues in a number of ways, dependent upon the number of wireless IO device position offset values missed, and the frequency with which this happens over a time of observation. For example, in some cases, a number of dropped packets is relatively low, or at least a portion of wireless IO device compressed input data packets are received in each data packet communication frame. In such a scenario, the wireless communication adapter/dongle microcontroller may execute code instructions of the wireless IO device missed position offset value recovery and compensation system in embodiments of the present disclosure to initiate a smart compensation mode for wireless IO device data received or missed in a data packet frame. The smart compensation mode of the wireless communication dongle microcontroller compensates for missed position offset values in in a data packet frame by assuming or projecting a constant movement occurred during the time slot in which the wireless communication dongle did not receive a wireless IO device compressed input data packet. In other words, the wireless IO device missed position offset value recovery and compensation system in such embodiments may estimate the missed wireless IO device position offset value or values based on the wireless IO device position offset values from wireless IO device compressed input data packets received either before or after the dropped packet or the time slot in which the wireless communication dongle transmits the updated polling packet. In other embodiments, previous positional offset values are repeated from a previous data packet or an estimated value is projected based on direction, previous offset amounts, or averaging between position values determined from received offset values on either side of missing offset values.

In some cases, where several consecutive wireless IO device compressed input data packets are dropped in a row, the wireless IO device missed position offset value recovery and compensation system may instruct the wireless IO device to transmit the missed wireless IO device position offset values in a data packet already scheduled for transmission during the next communication frame once, then immediately return to transmission of the compressed payloads that include the most recently measured wireless IO device position offset values. In the case where these methods do not deter ongoing dropped packets, such as when transmitting in a noisy radio frequency (RF) environment, the wireless communication adapter/dongle microcontroller executes code instructions of the wireless IO device missed position offset value recovery and compensation system may instruct the wireless IO device to also change the frequency hopping table used to transmit wireless IO device compressed input data packets from the wireless IO device to the wireless communication dongle, or to decrease the length of transmitted wireless IO device compressed input data packets (e.g., by transmitting only one payload with one set of mouse positional information, rather than two such payloads within a single wireless IO device compressed input data packet) to decrease the chance or consequences of radio interference. In such a way, the wireless IO device missed position offset value recovery and compensation system of embodiments of the present disclosure may compensate for, recover, or deter further dropped packets or missing of wireless IO device position offset values or additional packet retransmission requests at the wireless communication dongle.

FIG. 1 illustrates an information handling system 100 according to several aspects of the present disclosure. As described herein, an information handling system 100 or a controller 150 of a wireless communications dongle or integrated wireless radio adapter 130 operably connected to the information handling system 100 may execute code instructions of an input/output (IO) device wireless communication polling and packet frame system 155 with a missed position offset value recovery and compensation system 151 in an embodiment to orchestrate scheduled delivery of a plurality of wireless IO device compressed input data packets from each of one or more paired wireless input/output (IO) devices (e.g., 180 and 190) during scheduled data packet communication frames. It is appreciated that information handling system 100 may use a wireless communications dongle or integrated wireless radio adapter 130 to wirelessly communicate with one or more wireless IO devices 180 or 190. In embodiments herein, wireless communications dongle 130 may refer to a dongle operatively coupled to the information handling system 100 such as via a port or may be integrated within the information handling system 100 such as with an integrated wireless radio adapter with antenna system for wireless communication with the wireless IO devices 180 or 190. In various embodiments a wireless communications dongle 130, whether integrated or not within the information handling system 100 may operate using Bluetooth® Low Energy (BLE) radio layer protocol (e.g., BLE radio with Gaussian Frequency Shift Keying (GFSK) data modulation), as modified with the wireless IO device communication protocol of embodiments herein. An information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 152 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware controller, or any combination thereof. Additional components of the information handling system 100 may include one or more storage devices such as static memory 103 or drive unit 107, a wireless network interface device 160, and one or more communications ports for communicating with external devices such as wireless communication adapter/dongle 130 (referred to herein as a wireless communications dongle). A power management unit (PMU) 104 supplying power to the information handling system 100, via a battery 105 or an alternating current (A/C) power adapter 106 may supply power to one or more components of the information handling system 100, including the hardware processor 101, the wireless network interface device 160, a static memory 103 or drive unit 107, the wireless communication adapter/dongle 130, a video display 110, or other components of an information handling system. The video display 110 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 in an embodiment is operably coupled to a wireless communications dongle 130, which may orchestrate scheduled delivery of a select number of wireless IO device compressed input data packets of selected data packet length from each of one or more wireless input/output (IO) devices (e.g., 180 and 190) during scheduled data packet communication frames according to various embodiments of the present disclosure. The wireless communication adapter/dongle 130 in an embodiment may receive a select number of wireless IO device compressed input data packets of selected data packet length, each comprising one or more payloads of input data from one of the wireless IO devices (e.g., 180 and 190). For example, the wireless communication adapter/dongle 130 in an embodiment may receive a plurality of wireless IO device compressed input data packets from a wireless mouse or gaming controller (e.g., 180), each containing one or more payloads of positional information for the wireless mouse (e.g., 180) comprising compressed positional information from a USB human interface device (HID) formatted report and offset data from one position data point generated at the wireless mouse 180, as described in greater detail below with respect to FIGS. 2 and 4.

Upon receipt of the plurality of wireless IO device compressed input data packets from the wireless IO device(s) (e.g., 180 or 190) in an embodiment, the controller 150 for the wireless communication adapter/dongle 130 may execute code instructions of the IO device wireless communication polling and packet frame system 155 with the missed position offset value recovery and compensation system 151 to generate a USB HID formatted report that contains the uncompressed wireless IO device input data from offset data contained within the received wireless IO device compressed input data packets in a data packet frame to send to operating system (OS) 111. The information handling system 100 may include an operating system (OS) 111 that processes incoming data from various IO devices, including the wireless IO devices 180 and 190. Such an OS 111 in an embodiment may be capable of processing such IO data only when received in the USB HID format. As described herein, the wireless IO device compressed input data packets may only include a portion of information required for a USB HID report meeting these standards such as a first HID format for positional data or a position offset value that may be used to determine an updated wireless IO device position. As such, the controller 150 in an embodiment may execute code instructions of the IO device wireless communication polling and packet frame system 155 with the missed position offset value recovery and compensation system 151 to insert or translate the received payloads of the wireless IO device compressed input data packets into a standard USB HID compliant report and to add any additionally necessary data not included within the wireless IO device compressed input data packets due to any missed packets or data detected.

For example, the USB HID format for a mouse may require six bytes of initial position measurement data (e.g., $(X_0, Y_0)$) and six bytes of adjusted positional measurement data (e.g., $(X_1, Y_1)$) for the mouse. In such an embodiment, a first wireless IO device compressed input data packet received from a wireless mouse (e.g., 180) during a first data packet communication frame may contain only the six byte initial positional measurement data (e.g., $(X_0, Y_0)$) and then two bytes indicating an offset change value in positional measurement (e.g., $\Delta X_1, \Delta Y_1$) relative to this initial position measurement data. The controller 150 executing code instructions of the IO device wireless communication polling and packet frame system 155 with the missed position offset value recovery and compensation system 151 in such an embodiment may determine the adjusted positional measurement data for the first wireless IO device compressed input data packet (e.g., $(X_1, Y_1)$) by adding or subtracting the offset change value in positional measurement (e.g., $\Delta X_1, \Delta Y_1$) for the first wireless IO device compressed input data packet to the initial positional measurement data (e.g., $(X_0, Y_0)$). The microcontroller 150 of the adapter/dongle 130 executing code instructions of the IO device wireless communication polling and packet frame system 155 with the missed position offset value recovery and compensation system 151 in such an embodiment may then generate a USB HID report for the first wireless IO device compressed input data packet containing the six bytes of initial position measurement data (e.g., $(X_0, Y_0)$) taken directly from the first wireless IO device compressed input data packet from the first data packet communication frame and then six bytes of adjusted position measurement data (e.g., $(X_1, Y_1)$) determined based on the offset change values in positional measurement (e.g., $\Delta X_1, \Delta Y_1$).

In another example, in later-transmitted wireless IO device compressed input data packets transmitted in some embodiments within the first data packet communication frame or later data packet communication frames, the wireless IO device (e.g., 180) may only transmit an offset change value in positional measurement (e.g., $\Delta X_2, \Delta Y_2$) measured since transmission of the most recently transmitted data packet (e.g., the packet that included the position offset values $\Delta X_1, \Delta Y_1$). The controller 150 of the wireless adapter/dongle 130 executing code instructions of the IO device wireless communication polling and packet frame system 155 with the missed position offset value recovery and compensation system 151 in such an embodiment may determine the updated positional measurement data for the second wireless IO device compressed input data packet (e.g., $(X_2, Y_2)$) for an HID report format by adding or subtracting the offset change value in positional measurement (e.g., $\Delta X_2, \Delta Y_2$) for the second wireless IO device compressed input data packet to the adjusted positional measurement from the first wireless IO device compressed input data packet (e.g., $\Delta X_1, \Delta Y_1$), or by adding the position offset values from both the first and second wireless IO device compressed input data packets (e.g., $\Delta X_1 + \Delta X_2, \Delta Y_1 + \Delta Y_2$) to the initial positional measurement from the first wireless IO device compressed input data packet (e.g., $(X_0, Y_0)$). This method may be used to determine the updated position measurement data for each successive wireless IO device compressed input data packet so the wireless communication dongle 130 sends the wireless IO device positional information in adherence with the HID format to the OS 111 of the information handling system 100.

The dongle microcontroller 150 executing code instructions of the IO device wireless communication polling and packet frame system 155 with the missed position offset value recovery and compensation system 151 in such an embodiment may then generate the USB HID report for the wireless IO device compressed input data packets containing the six bytes of initial position measurement data (e.g., ($X_1$, $Y_1$)) from the wireless IO device compressed input data packet of the first data packet communication frame or later data packet communication frames with six bytes of adjusted position measurement data (e.g., ($X_2$, $Y_2$)) determined based on the offset change values in positional measurement (e.g., $\Delta X_2$, $\Delta Y_2$) within the most recently received wireless IO device compressed input data packet. The USB HID report in such an embodiment may then be transmitted to the OS 111 for translation of the positional measurements of the mouse into movement of the cursor on the video display 110 or translation of keystrokes received from a wireless keyboard to the OS 111.

As described herein, the determination of the adjusted positional measurement (e.g., $\Delta X_2$, $\Delta Y_2$) for each successively received wireless IO device compressed input data packet in such embodiments depends upon the wireless IO device position offset values (e.g., $\Delta X_1 + \Delta X_2$, $\Delta Y_1 + \Delta Y_2$) within all of the wireless IO device compressed input data packets received previously. As such, any dropped packets or measured position offsets not received at the wireless communication dongle 130 in embodiments may compromise the ability to determine the position of the wireless IO device (e.g., 180) following such a dropped packet or missed measurement. As also described herein, in embodiments in which each payload of a wireless IO device compressed input data packet contains an initial position in addition to position offset values, dropped packets may result in a decreased report rate. The microcontroller 150 executing code instructions of the wireless IO device missed position offset value recovery and compensation system 151 in an embodiment may compensate for, recover, or deter further dropped packets or missing of wireless IO device position offset values at the wireless communication dongle, as described in embodiments herein.

The wireless communication dongle 130 or integrated wireless radio adapter in an embodiment may house a microcontroller 150 executing firmware instructions of the IO device wireless communication polling and packet frame system 155 with the missed position offset value recovery and compensation system 151 in an embodiment. The wireless communication dongle 130 may be operatively coupled to the information handling system 100 through insertion of the wireless communication dongle 130 within a Universal Serial Bus (USB) port of the information handling system 100 in an embodiment, for example. In another embodiment, the wireless communication dongle 130 may be incorporated within the housing of the information handling system 100 as part of an integrated wireless radio adapter and operatively coupled to the bus 108 of the information handling system 100 through one of several means for transmitting data, including connection through a USB hub, a Thunderbolt hub, or any other type of data transfer hub known in the art.

The wireless communication dongle 130 in an embodiment may be wirelessly coupled to one or more wireless input output (IO) devices 180 and 190 capable of wirelessly receiving and transmitting data via Bluetooth® Low Energy (BLE) radio layer protocol (e.g., BLE radio with Gaussian Frequency Shift Keying (GFSK) data modulation), as modified with the wireless IO device communication protocol of embodiments herein, with the wireless communication adapter/dongle 130. In some embodiments, the wireless IO devices 180 or 190 may comprise a mouse, keyboard, speaker, headphones, earbuds, headset including a microphone, or various virtual reality peripherals including a headset or handheld input devices. Information handling system 100 may be any information handling system, such as a smart phone, tablet, or laptop, used with a wireless IO device 180 or 190.

The wireless communication dongle wireless radio system 199 or other integrated wireless radio adapter in an embodiment may be capable of communication between the information handling system 100 and the paired wireless IO devices 180 and 190 using a wireless link established using Bluetooth® Low Energy (BLE) radio layer protocol (e.g., BLE radio with Gaussian Frequency Shift Keying (GFSK) data modulation) as modified with the wireless IO device communication protocol of embodiments herein, for example. The wireless communication dongle wireless radio system 199 or other integrated wireless radio adapter in an embodiment may transmit and receive information necessary to pair the wireless IO devices 180 and 190 with the information handling system 100, such as, for example, pairing or wireless communication profiles for pairing the information handling system 100 and the wireless IO devices 180 and 190. Such pairing or wireless communication profiles may operate to identify the wireless IO devices 180 and 190 as a device authorized to transceive data with the information handling system 100 under the paired wireless protocol, as well as information sufficient to identify the wireless IO devices 180 and 190, such as a Media Access Control (MAC) address, IP address, or model number.

The wireless communication dongle wireless radio system 199 may provide connectivity of the wireless communication dongle 130 operatively coupled to the information handling system 100 via wireless links to one or more operatively coupled wireless input/output devices 180 or 190, such as mouse, keyboard, gaming controller, earbuds, headphones, smart speakers, or virtual reality peripherals, as described in greater detail herein. Such wireless links may be established pursuant to BLE radio layer protocol, for example. In some embodiments, BLE radio layer protocol with GFSK data modulation as modified with the wireless IO device communication protocol of embodiments herein may be used to establish a Private Area Network (PAN) (e.g., 170) in which the information handling system 100 may communicate wirelessly with any wireless IO devices (e.g., 180 and 190) paired to the PAN 170 using a BLE radio layer protocol (e.g., BLE radio with GFSK data modulation) compliant pairing and wireless communication profile. The PAN 170 in such an embodiment may communicate data between the information handling system 100 and any paired wireless IO devices (e.g., 180 and 190) over short distances using Ultra High Frequency (UHF) radio waves in the Industrial, Scientific, and Medical purposes bands (ISM bands) between 2.402 and 2.48 GHZ. Reference to Bluetooth® may refer to either or both of the Bluetooth® or Bluetooth Low Energy (BLE) and any revision of those protocols.

In some aspects of the present disclosure, the wireless communication dongle wireless radio system 199 may operate two or more wireless links. In other aspects of the present disclosure, the wireless communication dongle 130 may include a plurality of wireless communication dongle wireless radio systems, each capable of establishing a separate wireless link to one of the plurality of wireless IO devices (e.g., 180 or 190), such that the wireless communication dongle 130 may be in communication with a plurality of wireless IO devices (e.g., 180 and 190) via a plurality of wireless links.

The wireless communication dongle wireless radio system 199 may also operate in accordance with any Bluetooth® data communication standards, as modified with the wireless IO device communication protocol of embodiments herein. To communicate with a wireless personal area network (WPAN), standards including IEEE 802.15 WPAN standards, Service Discovery Protocol (SDP), Radio Frequency Communications (RFCOMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.400 to 2.4835 GHZ Industrial, Scientific, and Medical (ISM) band.

The present disclosure contemplates a computer-readable medium that includes instructions, parameters, and profiles 154 or receives and executes instructions, parameters, and profiles 154 responsive to a propagated signal, so that a device connected to the wireless communication dongle wireless radio system 199 may communicate voice, video or data to the wireless communication dongle 130. The wireless communication dongle 130 may include a set of instructions 154 that may be executed via a microcontroller 150, for example, to cause the wireless communication dongle 130 to perform any one or more of the methods or computer-based functions disclosed herein. For example, instructions 154 may include a particular example of an IO device wireless communication polling and packet frame system 155 with the missed position offset value recovery and compensation system 151, or other aspects or components. Application instructions 154 may also include any application processing drivers, or the like executing on information handling system 100 or wireless communication dongle 130.

The IO device wireless communication polling and packet frame system 155 with the missed position offset value recovery and compensation system 151 may utilize a computer-readable medium 152 in which one or more sets of instructions 154 may operate in part as firmware instructions executed by microcontroller 150 on the wireless communication dongle 130. The instructions 154 may embody one or more of the methods as described herein. For example, instructions relating to the IO device wireless communication polling and packet frame system 155 with the missed position offset value recovery and compensation system 151, firmware, processes, and/or methods may be stored here. More specifically, instructions 154 may be executed by microcontroller integrated circuit 150 or other processing resources such as an embedded controller (EC) or the processor 101 to orchestrate transmission of wireless IO device compressed input data packets from one or more wireless IO devices 180 and 190 as well as any missed data packet recovery and compensation with the wireless communication dongle 130 during a data packet communication frame according to embodiments herein. In other embodiments, the instructions 154 may be executed via a controller within the integrated wireless network interface device or wireless radio adapter 160 of the information handling system 100.

Memory 109 located and controlled by the wireless communication dongle 130 may contain computer-readable medium (not shown), such as RAM in an example embodiment. An example of memory 109 includes random access memory (RAM) such as static RAM (SRAM), dynamic RAM (DRAM), non-volatile RAM (NV-RAM), or the like, read only memory (ROM), another type of memory, or a combination thereof. The instructions, parameters, and profiles 154 of the IO device wireless communication polling and packet frame system 155 with the missed position offset value recovery and compensation system 151 may be stored in memory 109 on a computer-readable medium 152 such as a flash memory or magnetic disk in an example embodiment, or may be stored in main memory 102, static memory 103, or within drive unit 107. After an initial pairing process between the wireless communication dongle 130 and a plurality of wireless IO devices (e.g., 180 and 190), the microcontroller 150 may execute code instructions 154 of the IO device wireless communication polling and packet frame system 155 with the missed position offset value recovery and compensation system 151 to orchestrate transmission of a plurality of wireless IO device compressed input data packets from one or more of the wireless IO devices (e.g., 180 or 190) during one or more data packet communication frames, as described in embodiments herein.

The wireless network interface device 160 in an embodiment may be capable of communication between the information handling system 100 and network 170 (e.g., LAN, WLAN, WAN, WLAN) in some embodiments. The wireless network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

In some embodiments, software, firmware, dedicated hardware implementations such as application specific integrated circuits, programmable arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device." a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software or firmware executing on hardware, including firmware embedded at a device. Hardware processing resources may include processors or controllers, such as an Intel® brand processor, ARM® brand processors, Qualcomm® brand processors, or other processors and chipsets, or other such devices for software executing on hardware capable of operating a relevant environment of the information handling system. In an embodiment, an information handling system 100 may include an integrated circuit or a board-level product having portions thereof that may also be any combination of hardware and software. Devices, hardware resources, or controllers executing software or firmware modules or programs that are in communication with one another need not be in continuous communication with each other, unless expressly specified otherwise. In addition, devices, hardware resources, or controllers executing firmware or software modules or programs that are in communication with one another may communicate directly or indirectly through one or more intermediaries.

Figure 2:
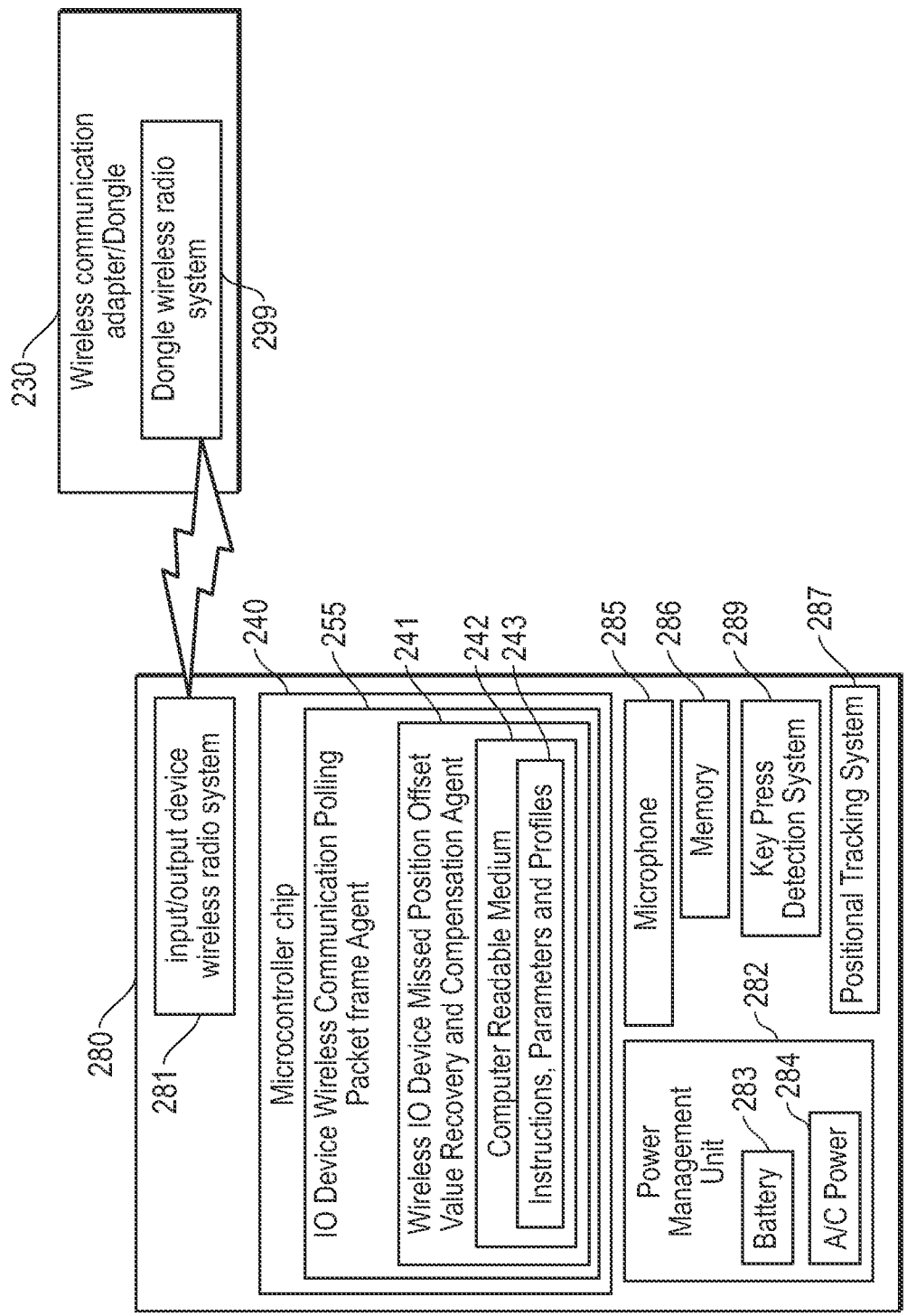
FIG. 2 is a block diagram illustrating a wireless IO device wirelessly paired to a wireless radio adapter or a wireless communication dongle that is operatively coupled to an information handling system according to an embodiment of the present disclosure.

FIG. 2 is a graphical diagram illustrating a wireless communication dongle 230 wirelessly paired to a wireless input/output (IO) device 280 according to an embodiment of the present disclosure. As described previously, the wireless communication dongle 230 may be a dongle device paired to an information handling system or integrated within an information handling system in various embodiments herein. The wireless IO device 280 in various embodiments herein may comprise a mouse, a keyboard, an audio headset, earbuds, gaming controllers, or various peripheral virtual reality devices (e.g., headset or handheld controllers). A power management unit 282 with a battery 283 or A/C power charging adapter 284 may be on the wireless IO device 280 to provide power to the microcontroller chip 240, the position tracking system 287, memory 286, or other components of the wireless IO device 280.

In an embodiment, the wireless IO device 280 may include a microcontroller chip 250 that may be any device or devices that execute instructions, parameters, and profiles 243 of an IO device wireless communication polling and packet frame agent 255 with missed position offset value recovery agent 241 at the wireless IO device 280 to transmit wireless IO device compressed input data packets from the wireless IO device 280 to the wireless communication dongle 230 during a data packet communication frame according to orchestrating instructions received from the wireless communication dongle 230. As described herein, the wireless communication dongle 230 in an embodiment may include a microcontroller executing code instructions of an IO device wireless communication polling and packet frame system with the missed position offset value recovery system to orchestrate transmission of a selected number of wireless IO device compressed input data packets of selected packet length from one or more paired wireless IO devices (e.g., 280) during any data packet communication frame. Such an orchestration may be initiated by transmission from the dongle wireless radio system 299 to the IO device wireless radio system 281 of one or more polling packets to each elicit the selected number of data packets at the selected data packet lengths, as described herein.

The IO device wireless communication polling and packet frame agent 255 with missed position offset value recovery agent 241 of the wireless IO device 280 may operate to generate wireless IO device compressed input data packets and to instruct the IO device wireless radio system 281 to transmit the select number of compressed data packets within a synchronized data packet communication frame between the wireless communication dongle 230 and the wireless IO device 280 according to the instructions in received polling packets having coordinating instructions as to number of packets, packet lengths, and time slots to be used.

The IO wireless radio system 281 in an embodiment may be capable of communication between the wireless IO device 280 and the wireless communication dongle 230 using a wireless link established under Bluetooth® or Bluetooth Low Energy (BLE) radio layer protocols (e.g., with Gaussian Frequency Shift Keying (GFSK) data modulation) as modified with the wireless IO device communication protocol of embodiments herein, for example. The IO device wireless radio system 281 may provide connectivity of the wireless IO device 280 to the wireless communication dongle 230, external or integrated, and is operatively coupled to the information handling system via one or more wireless links. Such wireless links may be established pursuant to BLE radio layer protocols (e.g., with Gaussian Frequency Shift Keying (GFSK) data modulation) as modified with the wireless IO device communication protocol of embodiments herein, for example. The IO device wireless radio system 281 may operate in accordance with any Bluetooth® data communication standards or BLE radio layer protocols (e.g., with Gaussian Frequency Shift Keying (GFSK) data modulation) as modified with the wireless IO device communication protocol of embodiments herein. To communicate with a wireless personal area network (WPAN), standards including IEEE 802.15 WPAN standards, Service Discovery Protocol (SDP), Radio Frequency Communications (RFCOMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.400 to 2.4835 GHZ Industrial, Scientific, and Medical (ISM) band.

The present disclosure contemplates a computer-readable medium 242 that includes instructions, parameters, and profiles 243 or receives and executes instructions, parameters, and profiles 243 responsive to a propagated signal, so that the IO device wireless radio system 281 may communicate voice, video or data to the wireless communication dongle 230, integrated or operatively coupled to the information handling system. In an embodiment in which the wireless IO device 280 comprises a mouse or gaming controller, the wireless IO device 280 may further include a position tracking system 287 capable of recording or tracking position offset values of the mouse with respect to the wireless communication dongle 230, as provided as input by the user of an information handling system. Such positional tracking system 287 may also determine a correlated position change for a cursor or visual graphical representation (e.g., game character, weapon, or camera view) within a software application executing on the information handling system operably connected to the wireless communication dongle 230. This positional information for the mouse or correlated changes to cursors or other graphical representations at the information handling system may be transmitted as data packets to the dongle wireless radio system 299 as described herein.

As also described herein, existing wireless IO devices transceive data packets adhering to the Universal Serial Bus (USB) Human Interface Device (HID) reporting formats for various types of devices that is not well-suited for higher sample rates. For example, a wireless mouse (e.g., 280) may transceive positional information for the mouse (e.g., 280) according to the USB HID reporting format that requires the positional data to include a six byte description of an initial position and a six byte description of each subsequently adjusted position for the mouse. However, positional data sampled in intervals less than 250-500 microseconds apart may be expressed by providing the initial position, along with an offset change in position away from this initial position to achieve compression of payload data according to embodiment herein. In following wireless IO device compressed input data packets transmitted repeatedly in short intervals (e.g., less than 250 microseconds), the positional data may be expressed by the initial position and a position offset value, or by the position offset value alone. Such an offset change in position may be expressed in two bytes to generate wireless IO device compressed input data, in comparison to the six bytes describing a subsequent adjusted position in HID reporting format.

Instructions 243 of the IO device wireless communication polling and packet frame agent 255 with missed position offset value recovery agent 241 may be executed by the microcontroller chip 250, for example a controller integrated circuit, to transmit such wireless IO device compressed input data packets to the wireless communication dongle 230 at an information handling system pursuant to polling packets generated at the IO device wireless communication polling and packet frame system with the missed position offset value recovery and compensation system operating at the wireless communication dongle 230. The polling packets are transmitted to the wireless IO device 280. Such instructions 243 of the IO device wireless communication polling and packet frame agent 255 with missed position offset value recovery agent 241 may include instructions for initiating generation of wireless IO device compressed input data packets and instructing transmission of those wireless IO device compressed input data packets by the IO device wireless radio system 281 of a selected data packet number, having a selected data packet length, at allotted data packet transmission time slots, as identified within polling packets received at the wireless IO device 280 from the wireless communication dongle 230.

The polling packet transmitted by the controller for the wireless communication dongle 230 in an embodiment may define a selected number of compressed input data packets (e.g., up to six) and a selected compressed data packet length (e.g., in bytes) that instructs the number and length of data packets the wireless IO device 280 should transmit to the wireless communication dongle 230 during wireless IO device allotted time slots within the next data packet communication session. In another aspect of an embodiment, the initial polling packet may identify a frequency hopping table for the wireless IO device 280 to use for transmission of wireless IO device compressed input data packets during future data packet communication frames, until notified otherwise by the wireless communication adapter/dongle 230. The controller 240 for the wireless IO device 280 that receives this polling packet may execute code instructions of the IO device wireless communication polling and packet frame agent 255 with missed position offset value recovery agent 241 to use these selected values from within the polling packet to set a sample rate at which the wireless IO device 280 takes input. For example, a wireless mouse or gaming controller may measure position via positional tracking system 287. In another example, a wireless keyboard or wireless mouse registers keystrokes or button presses via key press detection system 289. For example, in an embodiment in which the initial polling packet instructs delivery of a wireless IO device compressed input data packet containing two payloads of mouse positional data every 250 μs (e.g., to give a transmission rate of 8,000 mouse positional measurements per second), the wireless IO device 280 may set its sample rate to 125 μs or less. In the case of a mouse, this indicates positional measurements taken every 125 μs by the positional tracking system 287, and in the case of a keyboard, this indicates detection of keypresses every 125 μs by the key press detection system 289.

Setting of such a high sample rate or selection within the polling packet of a shorter wireless IO device compressed input data length in an embodiment may prompt the controller 240 for the wireless IO device 280 to execute code instructions of the IO device wireless communication polling and packet frame agent 255 with missed position offset value recovery agent 241 to compress the wireless IO device input data detected at the wireless IO device 280 prior to transmission of that wireless IO device input data as a payload of a wireless IO device compressed input data packets in the data packet communication frame to the wireless communication adapter/dongle 230. The controller 240 of the wireless IO device 280 in an embodiment may include a header portion of the data usually included in data packets adhering to the USB HID format requirements described above, to identify the type of wireless IO device (mouse, keyboard, etc.) in order to notify the type of the payload and compression type from the wireless IO device 280 in the compressed input data packets transceived to the wireless communication adapter/dongle 230.

For example, as described herein, positional data sampled in intervals less than 250-500 microseconds apart may be expressed by providing the initial position, along with data for an offset change in position away from this initial position when a mouse or gaming controller is moved, rather than providing data bytes for the initial position and same size or number of data bytes again for the next adjusted position. In embodiments in which a wireless mouse (e.g., 280) has set a sample rate to less than 250-500 microseconds between positional measurements taken via the positional tracking system 287, or in which the polling packet received from the wireless communication adapter/dongle 230 instructs transmission of packets in intervals less than 250-500 microseconds apart, the controller 240 for the wireless mouse or gaming controller (e.g., 280) may express positional measurements in each of such wireless IO device compressed input data packets as an initial position and a change or offset in position away from that initial position. This compressed expression of positional measurement may decrease the size of the wireless IO device compressed input data containing this compressed positional measurement by, for example four bytes, in comparison to the size of a wireless IO device input data packet containing consecutive positional measurements each adhering to the USB HID format.

As described herein, in embodiments in which each payload of a wireless IO device compressed input data packet contains an initial position in addition to position offsets, dropped packets may result in a decreased report rate. The wireless communication adapter/dongle 230 in an embodiment may compensate for, recover, or deter further dropped packets or missing of wireless IO device position offset values at the wireless communication dongle 230, as described herein.

In other embodiments, the controller 240 for the wireless mouse or gaming controller (e.g., 280) may express positional measurements in each of such wireless IO device compressed input data packets as an initial position in a first data packet and the change or offset in position away from that initial position in later wireless IO device data bytes and later wireless IO device compressed input data packets. This compressed expression of positional measurement may decrease the size of the wireless IO device compressed input data containing this compressed positional measurement by, for example several bytes in most instances, in comparison to the size of a wireless IO device input data packet containing consecutive positional measurements each adhering to the USB HID format.

As described herein, the determination of the adjusted positional measurement (e.g., $\Delta X_2$, $\Delta Y_2$) for each successively received wireless IO device compressed input data packet in such an embodiment depends upon the wireless IO device position offset values (e.g., $\Delta X_1 + \Delta X_2$, $\Delta Y_1 + \Delta Y_2$) within all of the wireless IO device compressed input data packets received previously. As such, any dropped packets or measured position offsets not received at the wireless communication adapter/dongle 230 in an embodiment may compromise the ability to determine the position of the wireless communication adapter/dongle 230 following such a dropped packet or missed measurement. The wireless communication adapter/dongle 230 in an embodiment may compensate for, recover, or deter further dropped packets or missing of wireless IO device position offset values at the wireless communication dongle 230, as described herein. For example, in some cases, where several consecutive wireless IO device compressed input data packets are dropped in a row, the wireless communication adapter/dongle 230 may instruct the wireless IO device 280 to retransmit the missed wireless IO device position offset values once, then immediately return to transmission of the compressed payloads that include the most recently measured wireless IO device position offset values. In the case where these methods do not deter ongoing dropped packets, such as when transmitting in a noisy radio frequency (RF) environment, the wireless communication adapter/dongle 230 may instruct the wireless IO device 280 to also change the frequency hopping table used to transmit wireless IO device compressed input data packets from the wireless IO device 280 to the wireless communication adapter/dongle 230, or to decrease the length of transmitted wireless IO device compressed input data packets, in order to decrease the chance or consequences of radio interference. In such a way, the wireless IO device missed position offset value recovery and compensation system and agent of embodiments of the present disclosure may compensate for, recover, or deter further dropped packets or missing of wireless IO device position offset values at the wireless communication adapter/dongle 230.

Identifying information for the wireless IO device 280 may be stored in memory 286 in an embodiment and transmitted in a header with any wireless IO device compressed input data packets for each type of wireless IO device data bytes therein. Such identifying information in an embodiment may operate to identify the wireless IO device 280 type to indicate to the wireless communication dongle 230 what type of compression may have been sent and how to regenerate the HID format report for the wireless IO device 280. The identifying information may also operate to identify the wireless IO device 280 as a device authorized to transceive data with the dongle 230, as well as information sufficient to identify the wireless IO device 280, such as a Media Access Control (MAC) address, IP address, or model number. In some embodiments, the identifying information for the wireless IO device 280 may identify a maximum sample rate for the wireless IO device 280.

The wireless IO device 280 may, in some embodiments includes a processing resource such as a microcontroller 240. Any of the processing resources described herein may be used and may operate to execute code that is either firmware or software code. Instructions 243 may include an IO device wireless communication polling and packet frame agent 255 with missed position offset value recovery agent 241 or other software applications or drivers detectable by the microcontroller 240 or other processing resource. The instructions 243 in an embodiment may reside completely, or at least partially, within the memory 286.

The wireless IO device 280 may include a set of instructions 243 that may be executed to cause the computer system such as the wireless IO device 280 to perform any one or more of the methods or computer-based functions disclosed herein. For example, instructions 243 may include a particular example of an IO device wireless communication polling and packet frame agent 255 with missed position offset value recovery agent 241, or other aspects or components.

The IO device wireless communication polling and packet frame agent 255 with missed position offset value recovery agent 241 on the wireless IO device 280 may utilize a computer-readable medium 242 in which one or more sets of instructions 243 such as firmware executed with microcontroller chip 240, for example a controller integrated circuit with embedded firmware in an example embodiment. In other embodiments, the IO device wireless communication polling and packet frame agent 255 with missed position offset value recovery agent 241 may operate in part as software or firmware instructions executed on the wireless IO device 280. The instructions 243 may embody one or more of the methods as described herein. For example, instructions relating to the IO device wireless communication polling and packet frame agent 255 with missed position offset value recovery agent 241, firmware or software algorithms, processes, and/or methods may be stored here.

Memory 286 may contain computer-readable medium (not shown), such as RAM in an example embodiment. An example of memory 286 includes random access memory (RAM) such as static RAM (SRAM), dynamic RAM (DRAM), non-volatile RAM (NV-RAM), or the like, read only memory (ROM), another type of memory, or a combination thereof. Memory 286 may also comprise static memory containing computer-readable medium (not shown), such as NOR or NAND flash memory in some example embodiments. The instructions, parameters, and profiles 243 of the IO device wireless communication polling and packet frame agent 255 with missed position offset value recovery agent 241 may be stored in memory 286 on a computer-readable medium 242 such as a flash memory or magnetic disk in an example embodiment.

Figure 3:
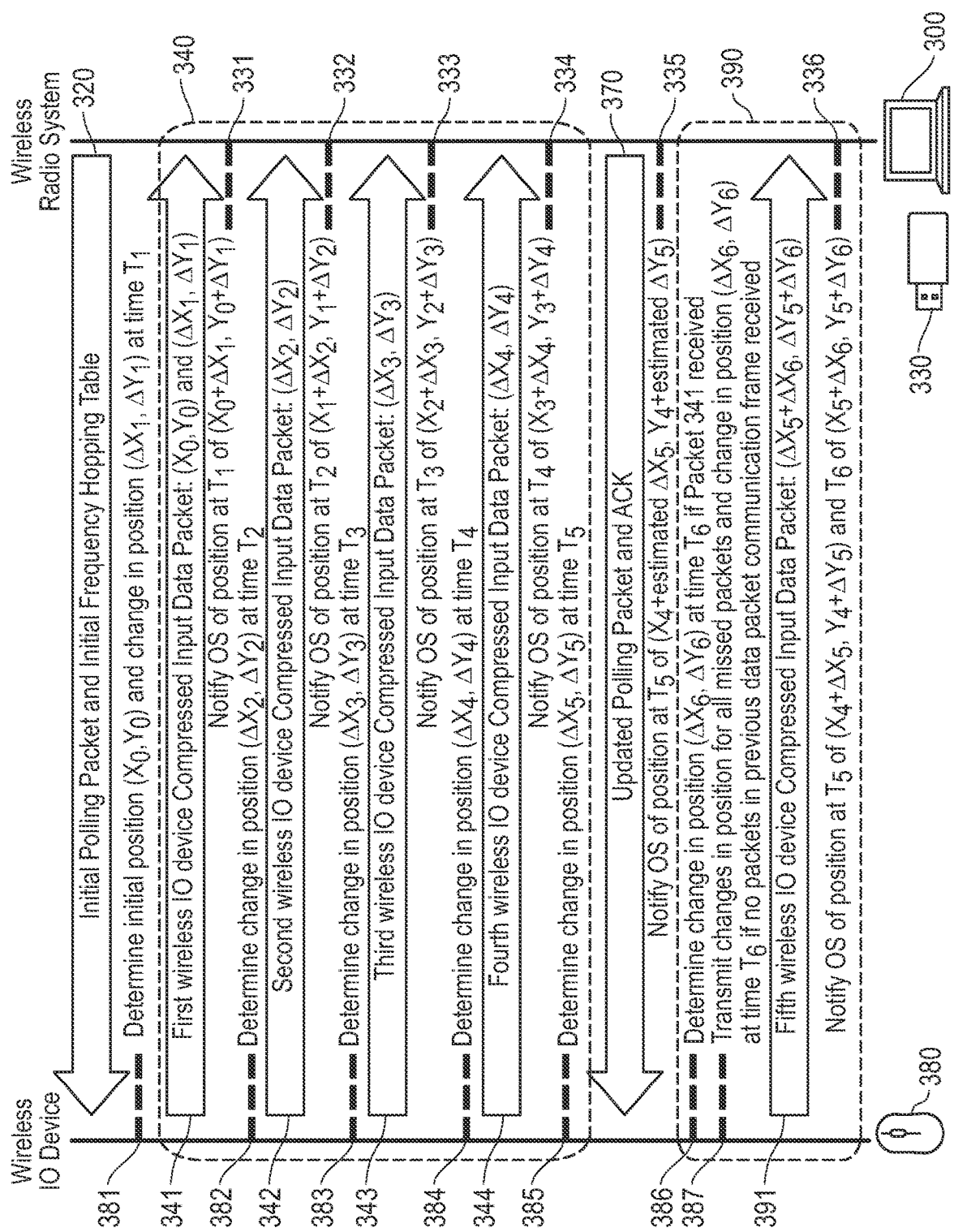
FIG. 3 is a block diagram illustrating a wireless IO device compressed input data packet communication frame orchestrated by the IO device wireless communication polling and packet frame system with recovery or compensation for dropped or missed positional offset values according to an embodiment of the present disclosure.

FIG. 3 is a block diagram illustrating generating a polling packet and a data packet communication frame for communication between a wireless communications dongle or integrated wireless radio system and a paired wireless input/output (IO) device orchestrated by a microcontroller of the wireless communications dongle or integrated wireless radio system. The microcontroller of the wireless communications dongle 330 or integrated wireless radio system of information handling system 300 executes code instructions of the IO device wireless communication polling and packet frame system and the missed position offset value recovery and compensation system according to an embodiment of the present disclosure.

As described herein, the IO device wireless communication polling and packet frame system and the missed position offset value recovery and compensation system executing at an information handling system 300 or via a controller within a wireless communications dongle 330 operably connected to the information handling system 300 in an embodiment may schedule receipt of a selected number of data packets of a selected length from one or more paired wireless IO devices (e.g., mouse 380) between delivery of polling packets 320 and 370 that include an acknowledgement header (ACK) to each of those one or more paired wireless IO devices (e.g., mouse 380). For ease of explanation, the IO device wireless communication polling and packet frame system and the missed position offset value recovery and compensation system in various embodiments herein may be described as executing at the wireless communications dongle 330 in some embodiments herein. However, it is also contemplated that the IO device wireless communication polling and packet frame system and the missed position offset value recovery and compensation system may operate internally within an integrated wireless radio system of the information handling system 300 in an embodiment.

Further, an IO device wireless communication polling and packet frame agent with a missed position offset value recovery and compensation agent may operate at the wireless IO device (e.g., mouse 380) in various embodiments herein. In any such embodiments, the wireless communication dongle 330 or integrated wireless radio system is capable of establishing wireless links with the wireless IO device 380 according to the Bluetooth® or Bluetooth® Low Energy (BLE) communications protocols, or according to BLE radio layer protocol (e.g., BLE radio with Gaussian Frequency Shift Keying (GFSK) data modulation), as modified according to the wireless IO device communication protocol of embodiments herein.

In an embodiment, the controller of the wireless communications dongle 330 or the information handling system 300 integrated wireless radio system executing code instructions of the IO device wireless communication polling and packet frame system and the missed position offset value recovery and compensation system in an embodiment may generate an initial polling packet 320. Polling packet 320 instructs each of the wireless IO devices (e.g., 380) paired with the wireless communications dongle 330 or the information handling system 300 to transmit a selected number of wireless IO device compressed input data packets of a selected compressed data packet length and at specified allotted time slots during a first data packet communication frame 340 between the wireless communications dongle 330 or the information handling system 300 and each of the paired wireless IO devices (e.g., 380) operatively coupled and having a successful request to connect 310. In another aspect of an embodiment, the initial polling packet 320 may identify a frequency hopping table for the wireless IO device 380 to use for transmission of wireless IO device compressed input data packets during future data packet communication frames (e.g., 340 and 390), until notified otherwise by the wireless communications dongle 330 or the information handling system 300.

The controller of the wireless communications dongle 330 or the information handling system 300 executing code instructions of the IO device wireless communication polling and packet frame system and the missed position offset value recovery and compensation system in an embodiment may select a number of compressed input data packets and a compressed data packet length, or wireless IO device allotted transmission time slots for receipt of wireless IO device compressed input data packets transmitted from that wireless IO device 380. Selection of data packet number and data packet length may be made based on default initial values that apply to the paired wireless IO device or to a wireless IO device 380 identifiable based on information given within a request to connect in an embodiment. For example, the controller of the wireless communications dongle 330 or the information handling system 300 executing code instructions of the IO device wireless communication polling and packet frame system and the missed position offset value recovery and compensation system may select a compressed input data packet number of four, a compressed input data packet length of 17 bytes (B), or wireless IO device allotted data packet transmission time slots, with each occurring every 0.000250 seconds (e.g., 250 μs) for receipt of wireless IO device compressed data packets transmitted from the wireless IO device 380 within a data packet communication frame 340 having a total length of 0.001 seconds. The controller of the wireless communications dongle 330 or the information handling system 300 may instruct the wireless radio system to transmit an initial polling packet 320 containing the selected compressed input data packet number, the selected compressed input data packet length, identified frequency hopping table, and wireless IO device allotted data packet transmission time slots. This initial polling packet 320 in an embodiment may synchronize communication between the wireless communications dongle 330 or the information handling system 300 and the wireless IO device 380 for a data packet communication frame 340 beginning at a specified time and having the specified duration (e.g., 0.001 seconds). Upon transmission of the initial polling packet 320 in an embodiment, the controller for the wireless communications dongle 330 or the information handling system 300 may switch the wireless radio system into a receive mode to await the beginning of the data packet communication frame 340 from the wireless IO device 380.

As described herein, such an orchestrated delivery of a selected number of wireless IO device compressed input data packets 341, 342, 343, and 344, each containing up to two mouse positional measurements within the data packet communication frame 340 may allow for the transmission of a wireless IO device compressed input data up to every 0.000250 seconds (250 μs), or at a rate of 8,000 mouse positional measurements per second. Use of this orchestrated delivery method in an embodiment may allow the wireless IO device 380 to transmit input data (e.g., positional information from a mouse) at a high transmission rate, and also to register that input data within the wireless IO device 380 at a high sample rate. In other words, a wireless mouse (e.g., 380) may take positional measurements more frequently.

Existing wireless IO devices transceive data packets adhering to the Universal Serial Bus (USB) Human Interface Device (HID) reporting formats for various types of devices that is not well-suited for these higher sample rates. For example, a wireless mouse (e.g., 380) may transceive positional information for the mouse (e.g., 380) according to the USB HID reporting format that requires the positional data to include a six byte description of an initial position and a six byte description of an adjusted position for the mouse. However, in embodiments of the present disclosure, positional data sampled in intervals less than 250-500 microseconds apart may be expressed by providing the initial position, along with an offset change in position values away from this initial position in each of the data packets 341, 342, 343, 344 of a first communication frame 340. In other embodiments of the present disclosure, positional data sampled in intervals less than 250-500 microseconds apart are expressed by providing the initial position in a first data packet 341 of a first communication frame 340, along with an offset change in position values away from this initial position in later-received data packets (e.g., 342-344).

A controller of the wireless IO device (e.g., 380) executing code instructions of the IO device wireless communication polling and packet frame agent with missed position offset value recovery and compensation agent in an embodiment may orchestrate compression of wireless IO device positional information into wireless IO device compressed input data payloads prior to transmission of those wireless IO device compressed input data packets. In an embodiment, the wireless IO device (e.g., mouse 380) that receives the initial polling packet 320 may use values from within the initial polling packet to set a sample rate at which the wireless IO device (e.g., mouse 380) takes input (e.g., measures position of the mouse) as wireless IO device input data. For example, in an embodiment in which the initial polling packet 320 instructs delivery of a wireless IO device compressed input data packet 341-344 containing two payloads of mouse positional data each within wireless IO device allotted time slots occurring every 250 μs (e.g., to give a transmission rate of 8,000 mouse positional measurements per second), the wireless IO device may set its sample rate to 125 μs or less. In the case of a mouse, this indicates positional measurements taken every 125 μs.

At 381, at a first time $T_1$, the wireless IO device (e.g., mouse 380) may begin to receive input data (e.g., positional measurements for the mouse 380) in the form of Universal Serial Bus (USB) human interface device (HID) formatted reports. This is done since the USB HID formatted wireless IO device input data is to be delivered to the OS of the information handling system 300 in this format. As described herein, existing wireless IO devices transceive data packets adhering to the Universal Serial Bus (USB) Human Interface Device (HID) reporting formats for various types of devices, but such a format is inefficient and is not well-suited for higher sample rates. Setting of such a high sample rate or selection within the initial polling packet 320 of a shorter wireless IO device compressed input data packet length in an embodiment may prompt a controller executing code instructions of an IO device wireless communication polling and packet frame agent with missed position offset value recovery and compensation agent at the wireless IO device (e.g., mouse 380) to compress the wireless IO device input data detected at the wireless IO device at 323 prior to transmission of that wireless IO device input data as a payload of a wireless IO device compressed input data packet (e.g., 341 to 344) to the wireless communication dongle 330 or information handling system 300 in data packet communication frame 340.

The controller of the wireless IO device (e.g., mouse 380) in an embodiment may include a portion of the data usually included in data packets adhering to the USB HID format requirements described above within the first mouse positional input data packet 341, such as for an initial position value (e.g., $(X_0, Y_0)$), and then use an abbreviated set of data for remaining data bytes normally in the USB HID format in order to decrease the payload of the wireless IO device compressed input data packets (e.g., any remainder of 341 to 344) transceived. For example, a first wireless IO device compressed input data packet 341 of a first data packet communication frame 340 (e.g., initial transmission of positional data from the wireless IO device 380 to the wireless communication dongle 330 or information handling system 300 upon establishment of a wireless link) in an embodiment may include a payload comprising the six byte initial position of the wireless IO device 380 (e.g., ($X_0$, $Y_0$)) and then two bytes indicating an offset change value in positional measurement (e.g., $\Delta X_1$, $\Delta Y_1$) of a next position relative to this initial position measurement data.

At 331 controller at the wireless communication dongle 330 or information handling system 300 executing code instructions of the IO device wireless communication polling and packet frame system and the missed position offset value recovery and compensation system in such an embodiment may determine the adjusted positional measurement data for the first wireless IO device compressed input data packet 341 (e.g., ($X_1$, $Y_1$)) by adding or subtracting the offset change value in positional measurement (e.g., $\Delta X_1$, $\Delta Y_1$) for the first wireless IO device compressed input data packet 341 with the initial positional measurement data (e.g., ($X_0$, $Y_0$)). The controller executing code instructions of the IO device wireless communication polling and packet frame system and the missed position offset value recovery and compensation system in such an embodiment may then regenerate a USB HID report from the first wireless IO device compressed input data packet 341 containing the six bytes of initial position measurement data (e.g., ($X_0$, $Y_0$)) taken directly from the first wireless IO device compressed input data packet 341 from the first data packet communication frame 340 and then six bytes of adjusted position measurement data (e.g., ($X_1$, $Y_1$)) determined based on the offset change values in positional measurement (e.g., $\Delta X_1$, $\Delta Y_1$).

In an embodiment in which each of the wireless IO device compressed input data packets (e.g., 342-344) also contain an initial positional measurement and a position offset value, this method may similarly be used to determine adjusted position measurement data for each of those packets (e.g., 342-344). For example, the second wireless IO device compressed input data packet 342 may transmit an initial position (e.g., $X_1$, $Y_1$) and an offset change value in positional measurement (e.g., $\Delta X_2$, $\Delta Y_2$) measured since transmission of the most recently transmitted data packet (e.g., 341). In such an embodiment, the controller executing code instructions of the IO device wireless communication polling and packet frame system and the missed position offset value recovery and compensation system may then regenerate a USB HID report from the second wireless IO device compressed input data packet 342 containing the six bytes of initial position measurement data (e.g., ($X_1$, $Y_1$)) taken directly from the second wireless IO device compressed input data packet 342 from the first data packet communication frame 340 and then six bytes of adjusted position measurement data (e.g., ($X_2$, $Y_2$)) determined based on the offset change values in positional measurement (e.g., $\Delta X_2$, $\Delta Y_2$).

As another example, the third wireless IO device compressed input data packet 34e may transmit an initial position (e.g., $X_2$, $Y_2$) and an offset change value in positional measurement (e.g., $\Delta X_3$, $\Delta Y_3$) measured since transmission of the most recently transmitted data packet (e.g., 342). In such an embodiment, the controller executing code instructions of the IO device wireless communication polling and packet frame system and the missed position offset value recovery and compensation system may then regenerate a USB HID report from the third wireless IO device compressed input data packet 343 containing the six bytes of initial position measurement data (e.g., ($X_2$, $Y_2$)) taken directly from the third wireless IO device compressed input data packet 343 from the first data packet communication frame 340 and then six bytes of adjusted position measurement data (e.g., ($X_3$, $Y_3$)) determined based on the offset change values in positional measurement (e.g., $\Delta X_3$, $\Delta Y_3$).

In still another example, the fourth wireless IO device compressed input data packet 344 may transmit an initial position (e.g., $X_3$, $Y_3$) and an offset change value in positional measurement (e.g., $\Delta X_4$, $\Delta Y_4$) measured since transmission of the most recently transmitted data packet (e.g., 343). In such an embodiment, the controller executing code instructions of the IO device wireless communication polling and packet frame system and the missed position offset value recovery and compensation system may then regenerate a USB HID report from the fourth wireless IO device compressed input data packet 344 containing the six bytes of initial position measurement data (e.g., ($X_3$, $Y_3$)) taken directly from the fourth wireless IO device compressed input data packet 344 from the first data packet communication frame 340 and then six bytes of adjusted position measurement data (e.g., ($X_4$, $Y_4$)) determined based on the offset change values in positional measurement (e.g., $\Delta X_4$, $\Delta Y_4$).

In another example, in an embodiment in which later-transmitted wireless IO device compressed input data packets (e.g., 342-344) transmitted within the first data packet communication frame 340 or later data packet communication frames (e.g., 390), the wireless IO device (e.g., 380) only transmits an offset change value in positional measurement (e.g., $\Delta X_2$, $\Delta Y_2$) measured since transmission of the most recently transmitted data packet (e.g., 341). At 382, the wireless IO device 380 in an embodiment may determine a position offset value of $\Delta X_2$, $\Delta Y_2$ at a time $T_2$, occurring between transmission of the first wireless IO device compressed input data packet 341 and the second wireless IO device compressed input data packet 342, and transmit this position offset value as the payload of the second wireless IO device compressed input data packet 342 to the wireless communication dongle 330 or information handling system 300. The controller executing code instructions of the IO device wireless communication polling and packet frame system and the missed position offset value recovery and compensation system at the wireless communication dongle 330 or the information handling system 300 in such an embodiment may determine the updated positional measurement data for the second wireless IO device compressed input data packet 342 at 332 (e.g., ($X_2$, $Y_2$)) by adding or subtracting the offset change value in positional measurement (e.g., $\Delta X_2$, $\Delta Y_2$) for the second wireless IO device compressed input data packet 342 to the adjusted positional measurement from the first wireless IO device compressed input data packet 341 determined at 331, or by adding the position offset values from both the first and second wireless IO device compressed input data packets 341 and 342 (e.g., $\Delta X_1 + \Delta X_2$, $\Delta Y_1 + \Delta Y_2$) to the initial positional measurement (e.g., ($X_0$, $Y_0$)) from the first wireless IO device compressed input data packet 341. This method may be used to determine the updated position measurement data for each successive wireless IO device compressed input data packet received at the wireless communication dongle 330 or the information handling system 300, until the wireless communication dongle 330 or information handling system 300 detects a dropped packet which may be estimated or requests the wireless IO device (e.g., 380) to retransmit positional information when no packets in a data packet frame are received, as described in greater detail below with respect to FIGS. 4 and 5.

For example, at 383, the wireless IO device 380 in an embodiment may determine a position offset value of $\Delta X_3$, $\Delta Y_3$ at a time $T_3$, occurring between transmission of the second wireless IO device compressed input data packet 342 and the third wireless IO device compressed input data packet 343, and transmit this position offset value as the payload of the third wireless IO device compressed input data packet 343 to the wireless communication dongle 330 or information handling system 300. The wireless communication dongle 330 or the information handling system 300 in an embodiment in which the wireless communication dongle 330 or information handling system 300 received packets 341 and 342 may determine the updated positional measurement data for the third wireless IO device compressed input data packet 343. For example, the wireless communication dongle 330 or the information handling system 300 in such an embodiment may determine the updated positional measurement data (e.g., $(X_3, Y_3)$) at 333 by adding or subtracting the offset change value in positional measurement (e.g., $\Delta X_3$, $\Delta Y_3$) for the third wireless IO device compressed input data packet 343 to the adjusted positional measurement determined from the second wireless IO device compressed input data packet 342 at 332, or by adding the position offset values from the first, second, and third wireless IO device compressed input data packets 341, 342, and 343 (e.g., $\Delta X_1 + \Delta X_2 + \Delta X_3$, $\Delta Y_1 + \Delta Y_2 + \Delta Y_3$) to the initial positional measurement (e.g., $(X_0, Y_0)$) from the first wireless IO device compressed input data packet 341.

As another example, at 384, the wireless IO device 380 in an embodiment may determine a position offset value of $\Delta X_4$, $\Delta Y_4$ at a time $T_4$, occurring between transmission of the third wireless IO device compressed input data packet 343 and the fourth wireless IO device compressed input data packet 344, and transmit this position offset value as the payload of the third wireless IO device compressed input data packet 344 to the wireless communication dongle 330 or information handling system 300. The wireless communication dongle 330 or the information handling system 300 in an embodiment in which the wireless communication dongle 330 or information handling system 300 received packets 341, 342, and 343 may determine the updated positional measurement data for the fourth wireless IO device compressed input data packet 344. For example, the wireless communication dongle 330 or the information handling system 300 in such an embodiment may determine the updated positional measurement data (e.g., $(X_4, Y_4)$) at 334 by adding or subtracting the offset change value in positional measurement (e.g., $\Delta X_4$, $\Delta Y_4$) for the third wireless IO device compressed input data packet 344 to the adjusted positional measurement determined from the second wireless IO device compressed input data packet 343 at 333, or by adding the position offset values from the first, second, third, and fourth wireless IO device compressed input data packets 341, 342, 343, and 344 (e.g., $\Delta X_1 + \Delta X_2 + \Delta X_3 + \Delta X_4$, $\Delta Y_1 + \Delta Y_2 + \Delta Y_3 + \Delta Y_4$) to the initial positional measurement (e.g., $(X_0, Y_0)$) from the first wireless IO device compressed input data packet 341.

In each of these cases (e.g., at 331, 332, 333, or 334) a controller for the wireless communication dongle 330 or information handling system 300 in an embodiment may then generate a USB HID report for each of these determined position measurements (e.g., $(X_1, Y_1)$, $(X_2, Y_2)$, $(X_3, Y_3)$, or $(X_4, Y_4)$) determined based on the wireless IO device position offset values transmitted within wireless IO device compressed input data packets 341, 342, 343, and 344. The USB HID report in such an embodiment may then be transmitted to the OS of information handling system 300 for translation of the positional measurements of the mouse into movement of a cursor on a video display via an OS of information handling system 300.

At 385, the wireless IO device 380 may determine a position offset value of $\Delta X_5$, $\Delta Y_5$ at a time $T_5$, occurring after transmission of the fourth wireless IO device compressed input data packet 344. However, the wireless IO device 380 may not transmit this position offset value as the payload of any wireless IO device compressed input data packet to the wireless communication dongle 330 or information handling system 300, because the time slot in which it would do so (e.g., immediately after time $T_5$) may be allotted to transmission by the wireless communication dongle 330 or information handling system 300 of an updated polling packet 370. As such, the wireless IO device 380 may store this determined wireless IO device position offset value (e.g., $\Delta X_5$, $\Delta Y_5$) for incorporation within a later transmitted wireless IO device compressed input data packet (e.g., 391) as described in greater detail below.

Following the data packet communication frame 340, the controller of the wireless communications dongle 330 or the information handling system 300 may switch the wireless radio system to a transmit mode for further synchronizing future data packet communication frames (e.g., 390) and also acknowledging receipt or missed packets from a previous data packet communication frame (e.g., 340). The controller may execute code instructions of the IO device wireless communication polling and packet frame system and the missed position offset value recovery and compensation system in an embodiment to generate and transmit an updated polling packet 370. In an embodiment, such an updated polling packet 370 may include an acknowledgement header (ACK) identifying the number (N) of packets received during the data packet communication frame 340. For example, in an embodiment in which the Nth packet 360 is the fourth of four packets allotted to the wireless IO device 380 for transmission within the data packet communication frame 340 within the initial polling packet 320, such an updated polling packet 370 may acknowledge receipt of four packets. In other embodiments, one or more of the wireless IO device compressed input data packets 341, 342, 343, or 344 may have been dropped or not received by the wireless communication dongle 330 or information handling system 300. In such an embodiment, the updated polling packet 370 may identify the time slot within the first communication frame 340 in which the dropped packet was expected to be received.

The updated polling packet 370 in an embodiment may further include updated instructions for synchronizing transmission of data packets within a second, later data packet communication frame. For example, the updated polling packet 370 may, at the very least, provide an updated time for initiation of such a second, later data packet communication frame 390. In such an embodiment, the updated polling packet 370 may or may not further adjust one or more of the selected wireless IO device compressed input data packet number, selected wireless IO device compressed input data packet length, or wireless IO device allotted data packet transmission time slots for the wireless IO device 380. For example, in an embodiment, the updated polling packet 370 identifying an updated time for initiation of a second, later data packet communication frame 390 may also provide an updated selected wireless IO device compressed input data packet number equivalent to the initial selected wireless IO device compressed input data packet number. In another example, in an embodiment, the updated polling packet 370 may also provide an updated selected wireless IO device compressed input data packet length equivalent to the initial selected wireless IO device compressed input data packet length. In still another example, in an embodiment, the updated polling packet 370 may also provide updated wireless IO device allotted data packet time slots having the same positions within the second data packet communication frame 390 as the positions of the initial wireless IO device allotted data packet transmission time slots within the first data packet communication frame 340.

At 335, the wireless communication dongle 330 or information handling system 300 in an embodiment may estimate the wireless IO device position offset value measured, but not transmitted by the wireless mouse 380 at 385. As described herein, the wireless communication dongle 330 or information handling system 300 may experience a missed wireless IO device position offset value (e.g., $\Delta X_5$, $\Delta Y_5$) during one of the time slots. In order to compensate for this missed or not transmitted wireless IO device position offset value (e.g., $\Delta X_5$, $\Delta Y_5$), the wireless communication dongle 330 or information handling system 300 may estimate continued constant or near-constant motion of the mouse, as determined from previously received wireless IO device compressed input data packets (e.g., 341, 342, 343, or 344) and project a value for $X_5$, $Y_5$ based on direction. For example, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value (e.g., $\Delta X_5$, $\Delta Y_5$) is equivalent to the wireless IO device position offset value (e.g., $\Delta X_4$, $\Delta Y_4$) transmitted as the payload of the fourth wireless IO device compressed input data packet 334 in the last time slot of the first data packet communication frame 340. As another example, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value (e.g., $\Delta X_5$, $\Delta Y_5$) is equivalent to the average of wireless IO device position offset values (e.g., average of $\Delta X_2$, $\Delta X_3$ and $\Delta X_4$, and average of $\Delta Y_2$, $\Delta Y_3$ and $\Delta Y_4$) transmitted as the payload of one or more previously received wireless IO device compressed input data packets (e.g., 332, 333, and 334) in the first data packet communication frame 340.

In still another embodiment, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value (e.g., $\Delta X_5$, $\Delta Y_5$) is equivalent to one pixel of movement in a direction that is equivalent to the direction of position offset (e.g., direction of $\Delta X_4$, or direction of $\Delta Y_4$) transmitted as the payload of the fourth wireless IO device compressed input data packet 334 in the last time slot of the first data packet communication frame 340.

In other words, if the position offset value (e.g., $\Delta X_4$, $\Delta Y_4$) is (+1 or −1, 0), this may indicate horizontal movement (e.g., either right or left). In such a case, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value (e.g., $\Delta X_5$, $\Delta Y_5$) is equivalent to one pixel of movement either right or left, depending on the position offset value (e.g., $\Delta X_4$, $\Delta Y_4$). In another example, if the position offset value (e.g., $\Delta X_4$, $\Delta Y_4$) is (0, +1 or −1), this may indicate vertical movement (e.g., either up or down). In such a case, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value (e.g., $\Delta X_5$, $\Delta Y_5$) is equivalent to one pixel of movement either up or down, depending on the position offset value (e.g., $\Delta X_4$, $\Delta Y_4$). In still another example, if the position offset value (e.g., $\Delta X_4$, $\Delta Y_4$) is (+1 or −1, +1 or −1), this may indicate diagonal movement (e.g., at a 45 degree angle). In such a case, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value (e.g., $\Delta X_5$, $\Delta Y_5$) is equivalent to one pixel of movement in a 45 degree angle, 135 degree angle, −45 degree angle or −135 degree angle from the last known position, depending on the position offset value (e.g., $\Delta X_4$, $\Delta Y_4$).

If a missing packet is in the middle of data packet communication frame 340, such as at transmitted packet 342 or 343, a projected value can be made based on an estimation between a previous and subsequent data packet position value. For example, the IO device wireless communication polling and packet frame system with the missed position offset value recovery and compensation system may utilize received initial or offset position values in data packets 341 and 343 to estimate the offset position value or actual position value that would have been determined from received data packet 342 if it is a missed data packet in an embodiment. For example, an averaged estimated position value or a regression between position values determined from received data packet 341 and 343 may be used to estimate the position value missing from data packet 342 for use in regenerating an HID reporting format by the dongle for the OS and wireless IO device drivers.

Following receipt of the updated polling packet 370 in an embodiment, the wireless IO device 380 and the wireless communication dongle 330 or information handling system 300 may begin a second data packet communication frame 390 as instructed within the updated polling packet 370. At 386, the wireless IO device 380 in an embodiment may determine a position offset value of $\Delta X_6$, $\Delta Y_6$ at a time $T_6$, occurring between receipt of the updated polling packet 370 and transmission of the fifth wireless IO device compressed input data packet 391 in the second data packet communication frame 390. As described above, the wireless IO device 380 may measure and store the determined wireless IO device position offset value (e.g., $\Delta X_5$, $\Delta Y_5$) for use to determine position value within a later transmitted wireless IO device compressed input data packet (e.g., 391). For example, the wireless IO device 380 may transmit the position offset value (e.g., $\Delta X_6$, $\Delta Y_6$) determined at $T_6$ from the position offset value (e.g., $\Delta X_5$, $\Delta Y_5$) determined at time $T_5$ as the payload of the fifth wireless IO device compressed input data packet 391 of the second data packet communication frame 390 to the wireless communication dongle 330 or information handling system 300.

In one example embodiment, the wireless communication dongle 330 or the information handling system 300 in an embodiment may determine at 336 the updated positional measurement data (e.g., ($X_5$, $Y_5$)) for the fifth wireless IO device compressed input data packet 391 as well as a next position measurement data (e.g., $X_6$, $Y_6$)) in the second data packet communication frame 390 at 334 by adding or subtracting the offset change value in positional measurement for the fifth wireless IO device compressed input data packet 391 to the cursor positional measurement data value determined from the fourth wireless IO device compressed input data packet 344 at 334 (e.g., $\Delta X_5 + \Delta X_6$, $\Delta Y_5 + \Delta Y_6$), or using any values estimated at 335 by the wireless communication dongle 330 or information handling system 300 when there is a missed position offset value (e.g., $\Delta X_5$, $\Delta Y_5$). In another example, the wireless communication dongle 330 or the information handling system 300 in an embodiment may determine the updated positional measurement data (e.g., ($X_6$, $Y_6$)) for the fifth wireless IO device compressed input data packet 391 of the second data packet communication frame 390 at 334 by averaging the position offset values from some combination of the first, second, third, or fourth wireless IO device compressed input data packets 341, 342, 343, or 344 relative to the initial positional measurement (e.g., ($X_0$, $Y_0$)) from the first wireless IO device compressed input data packet 341 to determine any values estimated at 335 by the wireless communication dongle 330 or information handling system 300 for a missed position offset value (e.g., $\Delta X_5$, $\Delta Y_5$).

As described herein, the determination of the adjusted positional measurement for each successively received wireless IO device compressed input data packet in some embodiments depends upon the wireless IO device position offset values within all of the wireless IO device compressed input data packets received to date. Estimated positional measurements for any missed position offset value may be based on other received positional offset values according to embodiments herein. As such, any dropped packets or measured position offsets not received at the wireless communication dongle 330 or information handling system 300 in embodiments could otherwise compromise the ability to determine the position of the wireless IO device (e.g., 380) following such a dropped packet or missed measurement. In other embodiments in which each payload of a wireless IO device compressed input data packet contains an initial position in addition to position offsets, dropped packets may result in a decreased report rate.

The microcontroller for the wireless communication dongle 330 or information handling system 300 executing code instructions of the wireless IO device missed position offset value recovery and compensation system in an embodiment may compensate for, recover, or deter further dropped packets or missing of wireless IO device position offset values at the wireless communication dongle. The controller for the wireless communication dongle 330 or information handling system 300 executing code instructions of the wireless IO device missed position offset value recovery and compensation system in an embodiment may address these issues in a number of ways, dependent upon the number of wireless IO device position offset values missed and those received, and the frequency with which this happens over a time of observation.

For example, in some cases, a number of dropped packets is relatively low, or at least a portion of wireless IO device compressed input data packets are received in each data packet communication frame. More specifically, the wireless communication dongle 330 or information handling system 300 in an embodiment may at least receive the first wireless IO device compressed input data packet 341 and the fourth wireless IO device compressed input data packet 344. In such a scenario, the controller of the wireless communication dongle 330 or information handling system 300 executing code instructions of the wireless IO device missed position offset value recovery and compensation system in an embodiment may initiate a smart compensation mode to incorporate estimated positional offset values as compensation for missed values determined in the data packet frame 340. Compensation for missed position offset values (e.g., in dropped packets at one or more of 342 or 343) may assume or project a constant movement occurred during the time slot in which the wireless communication dongle did not receive a wireless IO device compressed input data packet in one embodiment. In other words, the wireless IO device missed position offset value recovery and compensation system in such embodiments may estimate the missed wireless IO device position offset values (e.g., ($\Delta X_2$, $\Delta Y_2$) or ($\Delta X_3$, $\Delta Y_3$)) based on the wireless IO device position offset values (e.g., ($\Delta X_1$, $\Delta Y_1$) or ($\Delta X_4$, $\Delta Y_4$)) from wireless IO device compressed input data packets (e.g., 341 or 344) received either before or after the dropped packet (e.g., 342 or 343). In another aspect of such a scenario, the wireless IO device missed position offset value recovery and compensation system in such embodiments may estimate the missed wireless IO device position offset values (e.g., ($\Delta X_2$, $\Delta Y_2$) or ($\Delta X_3$, $\Delta Y_3$)) based on an average of wireless IO device position offset values (e.g., average of $\Delta X_1$ and $\Delta X_2$ or average of $\Delta Y_1$ and $\Delta Y_2$ for a missed or dropped data packet at 333 alone).

In still another embodiment, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value for a single dropped packet within the first data packet communication from 340 (e.g., $\Delta X_3$, $\Delta Y_3$) is equivalent to one pixel of movement in a direction that is equivalent to the direction of position offset (e.g., direction of $\Delta X_2$, or direction of $\Delta Y_2$) transmitted as the payload of the second wireless IO device compressed input data packet 332 of the first data packet communication frame 340.

In other words, if the position offset value (e.g., $\Delta X_2$, $\Delta Y_2$) is (+1 or −1, 0), this may indicate horizontal movement (e.g., either right or left). In such a case, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value (e.g., $\Delta X_3$, $\Delta Y_3$) is equivalent to one pixel of movement either right or left, depending on the position offset value (e.g., $\Delta X_2$, $\Delta Y_2$). In another example, if the position offset value (e.g., $\Delta X_2$, $\Delta Y_2$) is (0, +1 or −1), this may indicate vertical movement (e.g., either up or down). In such a case, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value (e.g., $\Delta X_3$, $\Delta Y_3$) is equivalent to one pixel of movement either up or down, depending on the position offset value (e.g., $\Delta X_2$, $\Delta Y_2$). In still another example, if the position offset value (e.g., $\Delta X_2$, $\Delta Y_2$) is (+1 or −1, +1 or −1), this may indicate diagonal movement (e.g., at a 45 degree angle). In such a case, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value (e.g., $\Delta X_3$, $\Delta Y_3$) is equivalent to one pixel of movement in a 45 degree angle, 135 degree angle, −45 degree angle or −135 degree angle from the last known position, depending on the position offset value (e.g., $\Delta X_2$, $\Delta Y_2$).

In some cases, where several consecutive wireless IO device compressed input data packets are dropped in a row, the wireless IO device missed position offset value recovery and compensation system may instruct the wireless IO device to transmit the missed wireless IO device position offset values within an wireless IO device data packet (e.g., 391) already scheduled for delivery in a second data packet communication frame 390 once, then immediately return to transmission of the compressed payloads that include the most recently measured wireless IO device position offset values at 387. For example, in an embodiment in which all wireless IO device compressed input data packets are dropped, the updated polling packet 370 may instruct, at 387, the wireless IO device 380 to transmit these missing wireless IO device position offset values in the fifth wireless IO device compressed input data packet 391.

In the case where these methods do not deter ongoing dropped packets, such as when transmitting in a noisy radio frequency (RF) environment, the wireless IO device missed position offset value recovery and compensation system may instruct the wireless IO device to also change the frequency hopping table used to transmit wireless IO device compressed input data packets from the wireless IO device to the wireless communication dongle, or to decrease the length of transmitted wireless IO device compressed input data packets, via a later polling packet for example, to decrease the chance or consequences of radio interference. For example, the controller for the wireless communication dongle 330 or information handling system 300 executing code instructions of the IO device wireless communication polling and packet frame system and the missed position offset value recovery and compensation system may initiate a smart compensation mode for data packet communication frames 340 in which it compensates for missed wireless IO device position offset values, as described in greater detail above and below with respect to FIG. 5 upon detecting a plurality of dropped packets over time that meet a threshold dongle smart compensation value. More specifically, controller for the wireless communication dongle 330 or information handling system 300 executing code instructions of the IO device wireless communication polling and packet frame system and the missed position offset value recovery and compensation system may initiate such a smart compensation for data packet communication frames 340 upon detecting thirty or more dropped packets within one minute in one example embodiment.

In an embodiment in which dropped packets continue to occur, despite the smart compensation mode methodology described herein, the controller for the wireless communication dongle 330 or information handling system 300 executing code instructions of the IO device wireless communication polling and packet frame system and the missed position offset value recovery and compensation system may initiate a change in tables used for a frequency hopping method. For example, in an embodiment in which the wireless communication dongle 330 or information handling system 300 detects a number of dropped packets meeting the threshold dongle smart compensation value within one minute after switching to the smart compensation mode for data packet communication frames 340, the controller for the wireless communication dongle 330 or information handling system 300 executing code instructions of the IO device wireless communication polling and packet frame system and the missed position offset value recovery and compensation system may instruct the wireless IO device 380 within the updated polling packet (e.g., 370) to switch to an adjusted frequency hopping table that differs from the frequency hopping table given within the initial polling packet 320 to shift the selection of radiofrequency channels used so that interference or collision issues may be avoided. In such a way, the wireless IO device missed position offset value recovery and compensation system of embodiments of the present disclosure may compensate for, recover, or deter further dropped packets or missing of wireless IO device position offset values at the wireless communication dongle.

Figure 4:
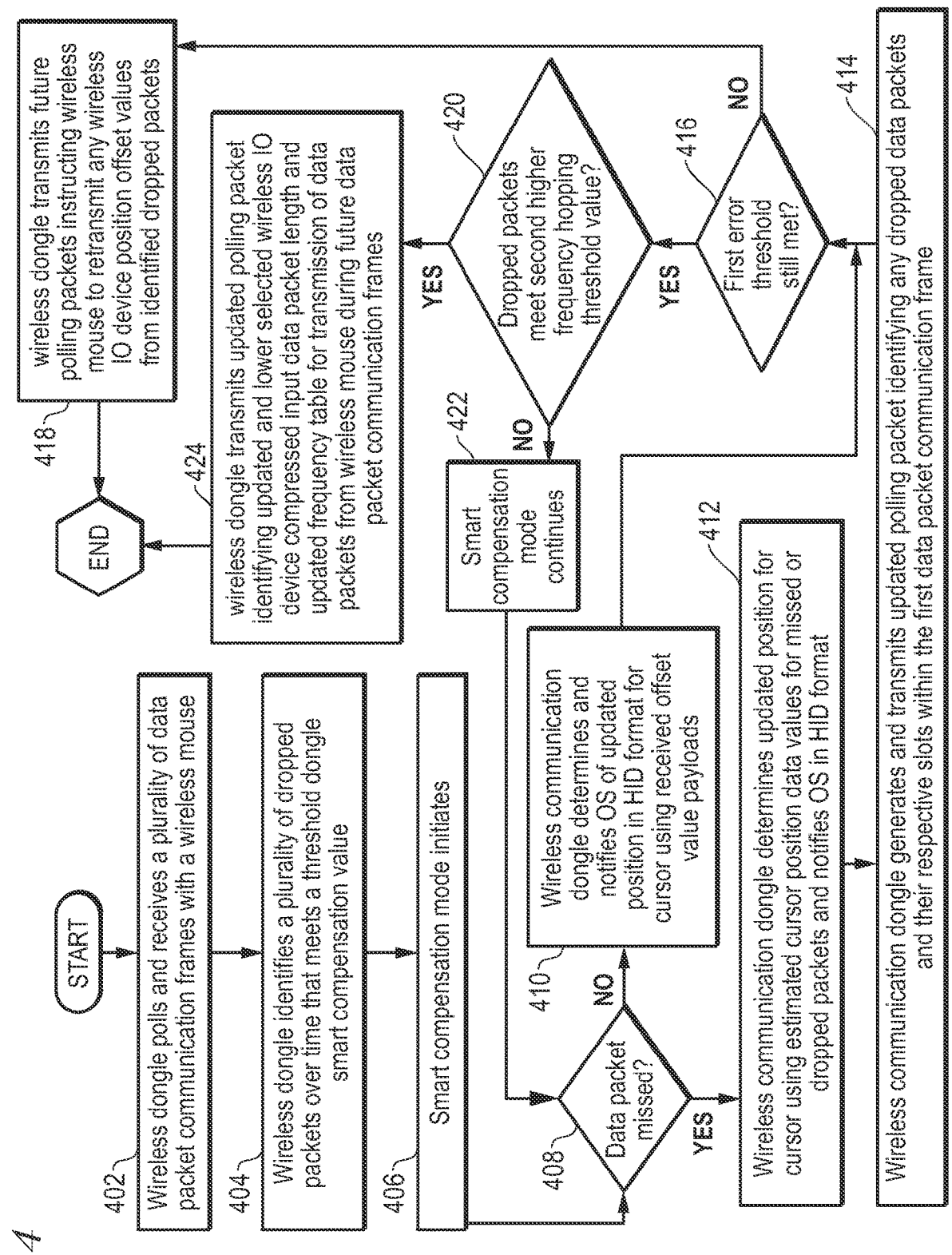
FIG. 4 is a flow diagram illustrating a method of compensating for, or recovering wireless IO device position offset values missed, dropped, or otherwise not received at a wireless communication dongle according to an embodiment of the present disclosure.

FIG. 4 is a flow diagram illustrating a method of compensating for, or recovering wireless IO device position offset values missed, dropped, or otherwise not received at a wireless communication dongle, based on the number of missed values, the frequency with which those values are missed, and the duration of such events according to an embodiment of the present disclosure. As described herein, the position for the cursor for each successively received wireless IO device compressed input data packet in some embodiments depends upon the wireless IO device position offset value within all of the wireless IO device compressed input data packets received previously and referenced to an initial position value. As such, any dropped packets or measured position offsets not received at the wireless communication dongle in embodiments may compromise the ability to determine the position of the wireless IO device following such a dropped packet or missed measurement. In other embodiments in which each payload of a wireless IO device compressed input data packet contains an initial position in addition to position offsets, dropped packets may result in a decreased report rate. The wireless IO device missed position offset value recovery and compensation system in an embodiment may address these issues in a number of ways, dependent upon the number of wireless IO device position offset values missed, and the frequency with which this happens over a time of observation. For example, in some cases, a number of dropped packets is relatively low, or at least a portion of wireless IO device compressed input data packets are received in each data packet communication frame. In such a scenario, the wireless IO device missed position offset value recovery and compensation system in such embodiments may estimate the missed wireless IO device position offset values based on the wireless IO device position offset values from wireless IO device compressed input data packets received either before or after the dropped packet or the time slot in which the wireless communication dongle transmits the updated polling packet.

In other cases, where several consecutive wireless IO device compressed input data packets are dropped in a row, the wireless IO device missed position offset value recovery and compensation system may instruct the wireless IO device to transmit the missed wireless IO device position offset values once within the payload of a wireless IO device data packet scheduled for delivery in the next data packet communication frame, then immediately return to transmission of the compressed payloads that include the most recently measured wireless IO device position offset values. In still other cases where these methods do not deter ongoing dropped packets frequently occurring, the wireless IO device missed position offset value recovery and compensation system may instruct the wireless IO device to also change frequency hopping tables, or to decrease the length of transmitted wireless IO device compressed input data packets to decrease the chance or consequences of radio interference.

At block 402, the wireless communication dongle may poll for and receive a plurality of data packet communication frames with a wireless IO device. For example, in an embodiment described with respect to FIG. 1, the wireless communication dongle 130 may engage in one or more data packet communication frames with the wireless IO device 180, in which wireless IO device position offset values are transmitted as payloads of a plurality of wireless IO device compressed input data packets. In such an initial data packet communication frame, the wireless communication dongle 130 may respond to dropped packets by instructing the wireless IO device 180 to transmit data any missed position offset values within the payload of a wireless IO device data packet scheduled for later transmission in an example embodiment.

The wireless communication dongle in an embodiment at block 404 may identify a plurality of dropped packets over time that meets a threshold dongle smart compensation value. For example, the wireless communication dongle 130 in an embodiment may determine a number of dropped packets meeting a threshold dongle smart compensation value (e.g., 30 in one minute). In other embodiments, any other threshold dongle smart compensation value may be used (e.g., 20-50 packets in one minute).

At block 406, the wireless communication dongle in an embodiment may initiate a smart compensation mode for use with received data packet communication frames. For example, in an embodiment described with respect to FIG. 3, the wireless communication dongle 330 or the information handling system 300 may initiate the first data packet communication frame 340 by transmitting the initial polling packet 320. Such an initial polling packet 320 in an embodiment may instruct transmission of a select number of wireless IO device compressed input data packets having a selected data packet length at allotted time slots within the first data packet communication frame 340. The initial polling packet 320 in an embodiment may further include identification of a frequency hopping table that should be used for transmission of such a selected number of wireless IO device compressed input data packets during the data packet communication frame 340. Smart compensation mode by the missed position offset value recovery and compensation system and agent will then monitor the received data packets in the data packet frames.

For each allotted time slot of the smart compensation data packet communication frame in an embodiment, the wireless communication dongle at block 408 may determine whether a packet has been received from the wireless IO device, as instructed by the initial polling packet. For example, the wireless communication dongle 330 or information handling system 300 may determine whether each of wireless IO device compressed input data packets 341, 342, 343, or 344 has been received from the wireless IO device 380, as instructed by the initial polling packet 320. As described herein, the wireless IO device missed position offset value recovery and compensation system in an embodiment may address the issue of dropped packets in a number of ways, dependent upon the number of wireless IO device position offset values missed, and the frequency with which this happens over a time of observation. If no dropped packets are detected, the method may proceed to block 410 for determination of updated positions for a cursor displayed via a digital display. If dropped packets are detected, the method may proceed to block 412 for estimation of position values in a missing packet for providing updated positions for a cursor displayed via a digital display, based on payloads from received wireless IO device compressed input data packets. Then updated position values are reformed in HID reporting format and sent to the OS of the information handling system.

At block 410, in an embodiment in which no dropped packets for the current data packet communication frame have been detected, the wireless communication dongle in an embodiment may determine an updated position for a cursor based on the received wireless IO device compressed input data packets and may transmit these values to the operating system of the information handling system 300 in an HID report. For example, at 381, at a first time $T_1$, the wireless IO device (e.g., mouse 380) may begin to receive input data (e.g., positional measurements for the mouse 380) in the form of Universal Serial Bus (USB) human interface device (HID) formatted reports. The controller of the wireless IO device (e.g., mouse 380) in an embodiment may include a portion of the data usually included in data packets adhering to the USB HID format requirements described above within the first mouse positional input data packet 341, such as an initial position value (e.g., $(X_0, Y_0)$), and then use an abbreviated set of data for remaining data bytes normally in the USB HID format in order to decrease the payload of the wireless IO device compressed input data packets (e.g., 341 to 344) transceived. For example, a first wireless IO device compressed input data packet 341 of a first data packet communication frame 340 (e.g., initial transmission of positional data from the wireless IO device 380 to the wireless communication dongle 330 or information handling system 300 upon establishment of a wireless link) in an embodiment may include a payload comprising the six byte initial position of the wireless IO device 380 (e.g., $(X_0, Y_0)$) and then two bytes indicating an offset change value in positional measurement (e.g., $\Delta X_1, \Delta Y_1$) relative to this initial position measurement data.

The microcontroller at the wireless communication dongle 330 or information handling system 300 executing code instructions of the IO device wireless communication polling and packet frame system and the missed position offset value recovery and compensation system in such an embodiment may determine at 331 the adjusted positional measurement data for the first wireless IO device compressed input data packet 341 (e.g., $(X_1, Y_1)$) by adding or subtracting the offset change value in positional measurement (e.g., $\Delta X_1, \Delta Y_1$) for the first wireless IO device compressed input data packet 341 to the initial positional measurement data (e.g., $(X_0, Y_0)$). The controller executing code instructions of the IO device wireless communication polling and packet frame system and the missed position offset value recovery and compensation system in such an embodiment may then generate a USB HID report for the first wireless IO device compressed input data packet 341 containing the six bytes of initial position measurement data (e.g., $(X_0, Y_0)$) taken directly from the first wireless IO device compressed input data packet 341 from the first data packet communication frame 340 and then six bytes of adjusted position measurement data (e.g., $(X_1, Y_1)$) determined based on the offset change values in positional measurement (e.g., $\Delta X_1, \Delta Y_1$).

In an embodiment in which each of the wireless IO device compressed input data packets (e.g., 342-344) also contain an initial positional measurement and a position offset value, this method may similarly be used to determine adjusted position measurement data for each of those packets (e.g., 342-344). For example, the second wireless IO device compressed input data packet 342 may transmit an initial position (e.g., $X_1, Y_1$) and an offset change value in positional measurement (e.g., $\Delta X_2, \Delta Y_2$) measured since transmission of the most recently transmitted data packet (e.g., 341). In such an embodiment, the controller executing code instructions of the IO device wireless communication polling and packet frame system and the missed position offset value recovery and compensation system may then regenerate a USB HID report from the second wireless IO device compressed input data packet 342 containing the six bytes of initial position measurement data (e.g., $(X_1, Y_1)$) taken directly from the second wireless IO device compressed input data packet 342 from the first data packet communication frame 340 and then six bytes of adjusted position measurement data (e.g., $(X_2, Y_2)$) determined based on the offset change values in positional measurement (e.g., $\Delta X_2, \Delta Y_2$).

As another example, the third wireless IO device compressed input data packet 34c may transmit an initial position (e.g., $X_2, Y_2$) and an offset change value in positional measurement (e.g., $\Delta X_3, \Delta Y_3$) measured since transmission of the most recently transmitted data packet (e.g., 342). In such an embodiment, the controller executing code instructions of the IO device wireless communication polling and packet frame system and the missed position offset value recovery and compensation system may then regenerate a USB HID report from the third wireless IO device compressed input data packet 343 containing the six bytes of initial position measurement data (e.g., $(X_2, Y_2)$) taken directly from the third wireless IO device compressed input data packet 343 from the first data packet communication frame 340 and then six bytes of adjusted position measurement data (e.g., $(X_3, Y_3)$) determined based on the offset change values in positional measurement (e.g., $\Delta X_3, \Delta Y_3$).

In still another example, the fourth wireless IO device compressed input data packet 344 may transmit an initial position (e.g., $X_3, Y_3$) and an offset change value in positional measurement (e.g., $\Delta X_4, \Delta Y_4$) measured since transmission of the most recently transmitted data packet (e.g., 343). In such an embodiment, the controller executing code instructions of the IO device wireless communication polling and packet frame system and the missed position offset value recovery and compensation system may then regenerate a USB HID report from the fourth wireless IO device compressed input data packet 344 containing the six bytes of initial position measurement data (e.g., $(X_3, Y_3)$) taken directly from the fourth wireless IO device compressed input data packet 344 from the first data packet communication frame 340 and then six bytes of adjusted position measurement data (e.g., $(X_4, Y_4)$) determined based on the offset change values in positional measurement (e.g., $\Delta X_4, \Delta Y_4$).

In another example, in later-transmitted wireless IO device compressed input data packets (e.g., 342-344) transmitted within the first data packet communication frame 340 or later data packet communication frames (e.g., 390), the wireless IO device (e.g., 380) may only transmit an offset change value in positional measurement (e.g., $\Delta X_2, \Delta Y_2$) measured since transmission of the most recently transmitted data packet (e.g., 341). At 382, the wireless IO device 380 in an embodiment may determine a position offset value of $\Delta X_2, \Delta Y_2$ at a time $T_2$, occurring between transmission of the first wireless IO device compressed input data packet 341 and the second wireless IO device compressed input data packet 342, and transmit this position offset value as the payload of the second wireless IO device compressed input data packet 342 to the wireless communication dongle 330 or information handling system 300. The controller executing code instructions of the IO device wireless communication polling and packet frame system and the missed position offset value recovery and compensation system at the wireless communication dongle 330 or the information handling system 300 in such an embodiment may determine the updated positional measurement data for the second wireless IO device compressed input data packet 342 at 332 (e.g., $(X_2, Y_2)$) by adding or subtracting the offset change value in positional measurement (e.g., $\Delta X_2, \Delta Y_2$) for the second wireless IO device compressed input data packet 342 to the adjusted positional measurement from the first wireless IO device compressed input data packet 341 determined at 331, or by adding the position offset values from both the first and second wireless IO device compressed input data packets 341 and 342 (e.g., $\Delta X_1+\Delta X_2, \Delta Y_1+\Delta Y_2$) to the initial positional measurement (e.g., $(X_0, Y_0)$) from the first wireless IO device compressed input data packet 341. This method may be used to convert the updated position measurement data for each successive wireless IO device compressed input data packet received at the wireless communication dongle 330 or the information handling system 300 to HID format for the OS of information handling system 300 until the wireless communication dongle 330 or information handling system 300 detects a dropped packet level, such as all packets in a frame missing, requiring the wireless IO device (e.g., 380) to retransmit positional information.

In each of these cases (e.g., at 331, 332, 333, or 334) a controller for the wireless communication dongle 330 or information handling system 300 in an embodiment may then generate a USB HID report for each of these determined position measurements (e.g., $(X_1, Y_1)$, $(X_2, Y_2)$, $(X_3, Y_3)$, or $(X_4, Y_4)$) determined based on the wireless IO device position offset values transmitted within wireless IO device compressed input data packets 341, 342, 343, and 344. The USB HID report in such an embodiment may then be transmitted to the OS of information handling system 300 for translation of the positional measurements of the mouse into movement of a cursor on a video display. The method may then proceed to block 414 for transmission of an updated polling packet.

Returning to block 408, when the wireless communication dongle in an embodiment detects dropped data packets within the current data packet communication frame the missed position offset value recovery and compensation system may estimate and determine position values for missing data packets in updated positions for a cursor movement that have been estimated based on recently received wireless IO device position offset values at block 412. For example, the wireless communication dongle may perform such an estimation using any one of the methods described with respect to FIG. 5 below, depending on the number, time slot, and frequency of the identified dropped packets. Various estimation techniques may be used including projecting a missing position offset value based on one or more position offset values recently received, projecting a next pixel in an x and y direction of cursor movement, or linear progression based on received position values before and after the missing positional offset value among other estimation techniques in embodiments herein.

At block 414, in an embodiment in which the wireless communication dongle has provided updated cursor positions, with estimated missing packet positional values where applicable, to the operating system, the wireless communication dongle may generate and transmit an updated polling packet. The updated polling packet identifies any dropped data packets and their respective slots within the first data packet communication frame. For example, the wireless communication dongle 330 or information handling system 300 may generate and transmit an updated polling packet 370 identifying any dropped data packets and their respective slots within the first data packet communication frame 340. As described in greater detail below with respect to FIG. 5, the time slot in which such a dropped packet or number of dropped packets occurs may influence the type of compensation applied by the wireless communication dongle 330 or information handling system.

The wireless communication dongle may determine at block 416 whether a first data packet error threshold value for dongle smart compensation is still met. In other words, the wireless communication dongle 330 or the information handling system 300 may determine whether the load of dropped packets currently being detected can efficiently be handled using the smart compensation data packet communication frame 340, or whether other compensation or recovery methods should also be employed. If the threshold dongle smart compensation value is no longer being met, this may indicate no continuing need for the wireless communication dongle 330 or information handling system 300 to compensate for dropped packets with estimating missing positional values (e.g., using the methods described in greater detail below with respect to FIG. 5), and the method may proceed to block 418 to place the wireless IO device 380 into a default retransmission mode. If the first data packet error threshold value for dongle smart compensation is still being met 416, this may indicate an ongoing need for the wireless communication dongle 330 or information handling system 300 to compensate for dropped packets (e.g., using the methods described in greater detail below with respect to FIG. 5), and the method may proceed to block 420 to determine whether additional measures may also be needed in order to compensate for the number of dropped packets detected.

At block 418, in an embodiment in which the first data packet error threshold value for dongle smart compensation is no longer being met, the wireless communication dongle may place the wireless IO device into a default retransmission mode in which it automatically retransmits any missed wireless IO device position offset values within identified dropped packets. For example, when the threshold dongle smart compensation value is no longer being met, this may indicate no continuing need for the wireless communication dongle 330 or information handling system 300 to compensate for dropped packets (e.g., using the methods described in greater detail below with respect to FIG. 5) and any occasional data packet error may use retransmission or may, in some cases, be ignored. The method for compensating for, or recovering wireless IO device position offset values missed, dropped, or otherwise not received at a wireless communication dongle may then end.

The wireless communication dongle in an embodiment in which the threshold dongle smart compensation value is still being met at block 416 may proceed to block 420. At block 420, the missed position offset value recovery and compensation system determines whether a second, higher data packet error threshold value or frequency of dropped packets is met. At the second, higher data packet error threshold value the missed position offset value recovery and compensation system may determine another type of compensation is required such as a change in the frequency hopping table used for wireless communications. For example, the wireless communication dongle in an embodiment may determine if the second, higher data packet error threshold value for dongle smart compensation is continuing to be met after one minute of using the smart compensation method described herein. If the frequency of dropped packets meets a second, higher data packet error threshold value, this may indicate that the smart compensation methods employed by the wireless communication dongle (e.g., as described in greater detail with respect to FIG. 5) may be insufficient to address the large volume of dropped packets. In such a case, the method may proceed to block 424 to direct the wireless IO device to switch frequency hopping tables. If the frequency of dropped packets does not meet the second, higher data packet error threshold value, this may indicate that the smart compensation methods described herein may sufficiently address any dropped packets, and the method may continue to block 422 for initiation of another data packet communication frame and smart compensation monitoring of the same.

At block 422, in an embodiment in which the volume of detected dropped packets continues to meet the first data packet error threshold value for smart compensation, but does not meet the second, higher data packet error threshold value, the wireless communication dongle may initiate another data packet communication frame and conduct smart compensation on the received data packets if data packets are detected as missing from the data packet frame. Meeting the former threshold value while not meeting the latter threshold value in an embodiment may indicate a need for further smart compensation steps by the wireless communication dongle (e.g., as described in greater detail with respect to FIG. 5) during future data packet communication frames. In such an embodiment the wireless communication dongle 330 or information handling system 300 may transmit an updated polling packet 370 instructing initiation of a second data packet communication frame 390. The controller for the wireless communication dongle 330 or information handling system 300 may execute code instructions of the wireless IO device missed position offset value recovery and compensation system to compensate for any missed wireless IO device position offset values in dropped packets for future data packet communication frames (e.g., including 390). The method may then proceed back to block 408 to perform such a methodology.

The wireless dongle, in an embodiment in which the frequency of dropped packets meets the second, higher data packet error threshold value, may transmit an updated polling packet at block 424 identifying an updated and lower selected wireless IO device compressed input data packet length, an updated frequency table for transmission of data packets, or some combination. For example, in an embodiment in which dropped packets continue to occur, despite the smart compensation methodology described herein, the controller for the wireless communication dongle 330 or information handling system 300 executing code instructions of the IO device wireless communication polling and packet frame system and the missed position offset value recovery and compensation system may initiate a change frequency hopping table used. More specifically, in an embodiment in which the wireless communication dongle 330 or information handling system 300 detects a number of dropped packets meeting the second, higher data packet error threshold value for smart compensation within one minute after switching to the smart compensation, the controller for the wireless communication dongle 330 or information handling system 300 executing code instructions of the IO device wireless communication polling and packet frame system and the missed position offset value recovery and compensation system may instruct the wireless IO device 380 within the updated polling packet (e.g., 370) to switch to an adjusted frequency hopping table that differs from the frequency hopping table given within the initial polling packet 320. The method for compensating for, or recovering wireless IO device position offset values missed, dropped, or otherwise not received at a wireless communication dongle may then end although additional monitoring for data packet errors and error levels in received data packet frames will continue. In such a way, the wireless IO device missed position offset value recovery and compensation system of embodiments of the present disclosure may compensate for, recover, or deter further dropped packets or missing of wireless IO device position offset values at the wireless communication dongle.

Figure 5:
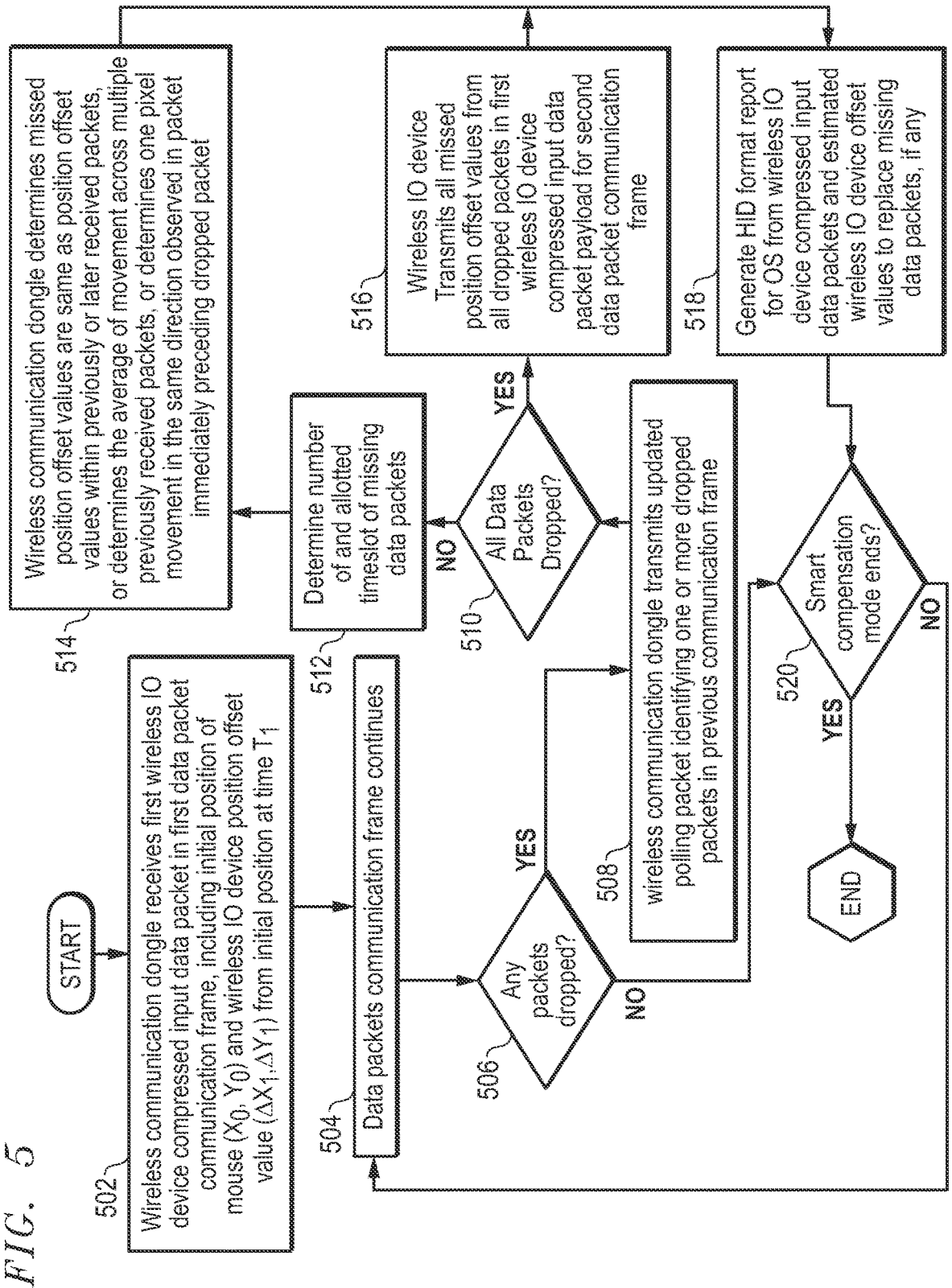
FIG. 5 is a flow diagram illustrating a method of estimating missed wireless IO device position offset values or instructing retransmission of missed wireless IO device position offset values as compensation for wireless data packet communications according to an embodiment of the present disclosure.

FIG. 5 is a flow diagram illustrating a method of estimating missed wireless IO device position offset values based on previously or later received wireless IO device position offset values, or instructing a one-time retransmission of missed wireless IO device position offset values by the wireless IO device according to an embodiment of the present disclosure. As described herein, in some cases, a number of dropped packets is relatively low but may occur with some regularity, or at least a portion of wireless IO device compressed input data packets are received in each data packet communication frame. In such a scenario, the wireless IO device missed position offset value recovery and compensation system in such embodiments may estimate the missed wireless IO device position offset values based on the wireless IO device position offset values from wireless IO device compressed input data packets received either before or after the dropped packet or the time slot in which the wireless communication dongle transmits the updated polling packet.

At block 502, the wireless communication dongle in an embodiment may receive a first wireless IO device compressed input data packet in a first data packet communication frame, including an initial position of a wireless IO device and a wireless IO device position offset value. In such an example embodiment, the wireless communication dongle may have initiated monitoring with smart compensation for any detected missing data packets in received wireless data packet frames. For example, in an embodiment described with respect to FIG. 3, the wireless IO device 380 may transmit to a wireless communication dongle 330 or information handling system 300 a first wireless IO device compressed input data packet 341 of a first data packet communication frame 340 (e.g., initial transmission of positional data from the wireless IO device 380 to the wireless communication dongle 330 or information handling system 300 upon establishment of a wireless link) that includes a payload comprising the six byte initial position of the wireless IO device 380 (e.g., $(X_0, Y_0)$) and then two bytes indicating an offset change value in positional measurement (e.g., $\Delta X_1, \Delta Y_1$) relative to this initial position measurement data. In some embodiments, if an initial position of a cursor was already established in a previous data packet frame, then first wireless IO device compressed input data packet 341 may contain merely a continuation of position offset values as shown in the second data packet frame 390 of FIG. 3.

At block 504, the wireless IO device may continue to transmit additional wireless IO device compressed data packets in the first data packet communication frame in an embodiment withing scheduled transmission slots for the one or more additional wireless IO device compressed input data packets. For example, the first data packet communication frame 340 in an embodiment may continue with transmission by the wireless IO device 380 to the wireless communication dongle 330 or the information handling system 300 of second, third, and fourth wireless IO device compressed input data packets 342, 343, and 344, respectively. As described herein, the wireless communication dongle 330 or the information handling system 300 in various embodiments may not receive one or more of these wireless IO device compressed input data packets (e.g., 342, 343, or 344). In such a case, the wireless communication dongle 330 or information handling system 300 may detect a dropped packet in the allotted time slot in which such wireless IO device compressed input data packets were expected to be received.

At block 506, the wireless communication dongle may determine whether any of the wireless IO device compressed input data packets scheduled for delivery during the first communication frame have been dropped. As described herein, the wireless IO device missed position offset value recovery and compensation system in an embodiment may compensate for missed wireless IO device position offset values not transmitted by the wireless IO device during a time slot allotted to transmission by the wireless communication dongle via the polling packet sent to the wireless IO device. If the wireless communication dongle detects dropped packets in the first data packet communication frame, the method may proceed to block 508 for identification of the one or more dropped packets to the wireless IO device. If the wireless communication dongle does not detect dropped packets in the first data packet communication frame, the method may proceed to block 520 to regenerate wireless IO device input positional values for cursor movement in HID reporting format from compressed positional offset values received in the wireless IO device compressed data packets.

In an embodiment in which the wireless communication dongle detects dropped packets within the first data packet communication frame, the wireless communication dongle at block 508 may transmit an updated polling packet identifying one or more dropped packets in the previous communication frame. For example, the wireless communication dongle 330 or the information handling system 300 may transmit the updated polling packet 370 identifying any dropped packets at 341, 342, 343, or 344. The updated polling packet 370 may further identify the time slot in which such a dropped packet was scheduled for transmission. As described herein, the wireless IO device missed position offset value recovery and compensation system in an embodiment may address dropped packets in a number of ways, dependent upon the number of wireless IO device position offset values missed, and the frequency with which this happens over a time of observation.

At block 510, the wireless communication dongle may determine whether all packets including the fourth packet or last packet scheduled within the first data packet communication frame were dropped. In an embodiment, if all four packets within the first data packet communication frame 340 is dropped, it may be appropriate for the wireless IO device 380 to transmit any missed wireless IO device position offset values from dropped packets in the first data packet communication frame 340. This may apply when the fourth or last packet is dropped along with multiple packets. The method in such an embodiment may proceed to block 516. If all wireless IO device compressed input data packets within the first data packet communication frame are not dropped, the method may proceed to block 512 to determine a number of dropped packets and which packets within the first data packet communication frame were dropped.

The wireless communication dongle in an embodiment at block 512 may determine how many wireless IO device compressed input data packets have been dropped and which packets were dropped during the first data packet communication frame. The wireless communication dongle executing code instructions of the missed position offset value recovery and compensation system in an embodiment may implement any of one or more options for ways to estimate missed wireless IO device position offset values in the case where only a subset wireless IO device position offset value has been missed, rather than in the case where multiple values have been missed. If a subset of wireless IO device position offset values have been missed due to one or more dropped packets, the method may proceed to block 514 for estimation of the missed wireless IO device position offset value using one of the plurality of methods. If multiple wireless IO device position offset values have been missed due to multiple dropped packets, the method may proceed to block 516 for estimation of the missed wireless IO device position offset value using a single method.

At block 514, in an embodiment in which a single wireless IO device position offset value has been missed due to a subset of dropped packets in a received data packet frame, the wireless communication dongle may estimate the missed wireless IO device position offset value using one of a plurality of methods. For example, the controller of the wireless communication dongle 330 or information handling system 300 executing code instructions of the wireless IO device missed position offset value recovery and compensation system in an embodiment may initiate the smart compensation mode for monitoring received data packet frame 340 in which it compensates for missed position offset values (e.g., in dropped packets at one or more of 342 or 343) by assuming a constant movement occurred during the time slot in which the wireless communication dongle did not receive a wireless IO device compressed input data packet. In other words, the wireless IO device missed position offset value recovery and compensation system in such embodiments may estimate the missed wireless IO device position offset values (e.g., ($\Delta X_2$, $\Delta Y_2$) or ($\Delta X_3$, $\Delta Y_3$)) based on the wireless IO device position offset values (e.g., ($\Delta X_1$, $\Delta Y_1$) or ($\Delta X_4$, $\Delta Y_4$)) from wireless IO device compressed input data packets (e.g., 341 or 344) received either before or after the dropped packet (e.g., 342 or 343). In another aspect of such a scenario, the wireless IO device missed position offset value recovery and compensation system in such embodiments may estimate the missed wireless IO device position offset values (e.g., ($\Delta X_2$, $\Delta Y_2$) or ($\Delta X_3$, $\Delta Y_3$)) based on an average of wireless IO device position offset values (e.g., average of $\Delta X_1$ and $\Delta X_2$ or average of $\Delta Y_1$ and $\Delta Y_2$ for a missed or dropped data packet at 333).

In still another embodiment, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value for a subset of dropped packets within the first data packet communication from 340 (e.g., $\Delta X_3$, $\Delta Y_3$) by projecting a data offset value or position value equivalent to one pixel of movement in a direction that is equivalent to the direction of position offset occurring in positional data of a previously received data packet (e.g., direction of $\Delta X_2$, or direction of $\Delta Y_2$) transmitted as the payload of the second wireless IO device compressed input data packet 332 of the first data packet communication frame 340.

In other words, if the position offset value (e.g., $\Delta X_2$, $\Delta Y_2$) is (+1 or −1, 0), this may indicate horizontal movement (e.g., either right or left). In such a case, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value (e.g., $\Delta X_3$, $\Delta Y_3$) is equivalent to one pixel of movement either right or left, depending on the position offset value (e.g., $\Delta X_2$, $\Delta Y_2$). In another example, if the position offset value (e.g., $\Delta X_2$, $\Delta Y_2$) is (0, +1 or −1), this may indicate vertical movement (e.g., either up or down). In such a case, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value (e.g., $\Delta X_3$, $\Delta Y_3$) is equivalent to one pixel of movement either up or down, depending on the position offset value (e.g., $\Delta X_2$, $\Delta Y_2$). In still another example, if the position offset value (e.g., $\Delta X_2$, $\Delta Y_2$) is (+1 or −1, +1 or −1), this may indicate diagonal movement (e.g., at a 45 degree angle). In such a case, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value (e.g., $\Delta X_3$, $\Delta Y_3$) is equivalent to one pixel of movement in a 45 degree angle, 135 degree angle, −45 degree angle or −135 degree angle from the last known position, depending on the position offset value (e.g., $\Delta X_2$, $\Delta Y_2$).

In another embodiment, where a subset of dropped packets are detected from a monitored data packet communication frame, the wireless communication dongle 330 or information handling system 300 in an embodiment may estimate the wireless IO device position offset value or values missing from data packets transmitted by the wireless mouse 380. As described herein, the wireless communication dongle 330 or information handling system 300 may experience a missed wireless IO device position offset value or values and compensate for this missed or not transmitted wireless IO device position offset value or values by using data from previous two cursor positional values or a position value after the missing wireless IO device positional offset value or values by estimating continued constant or near-constant motion of the mouse, as determined from previously received wireless IO device compressed input data packets (e.g., 341, 342, 343, or 344). An average gradient may be used to determine replacement positional data values based on these other received positional offset values in other data packets in the data packet frame. For example, the controller for the wireless communication dongle 330 or information handling system 300 executing code instructions of the IO device wireless communication polling and packet frame system and the missed position offset value recovery and compensation system in an embodiment may estimate that the missed wireless IO device position offset value or values (e.g., $\Delta X_5$, $\Delta Y_5$) is equivalent to the wireless IO device position offset value (e.g., $\Delta X_4$, $\Delta Y_4$) transmitted as the payload of the fourth wireless IO device compressed input data packet 334. As another example, the controller for the wireless communication dongle 330 or information handling system 300 executing code instructions of the IO device wireless communication polling and packet frame system and the missed position offset value recovery and compensation system in an embodiment may estimate that the missed or not transmitted wireless IO device position offset value (e.g., $\Delta X_5$, $\Delta Y_5$) is equivalent to the average of wireless IO device position offset values (e.g., average of $\Delta X_2$, $\Delta X_3$ and $\Delta X_4$, and average of $\Delta Y_2$, $\Delta Y_3$ and $\Delta Y_4$) transmitted as the payload of one or more previously received wireless IO device compressed input data packets (e.g., 332, 333, and 334) in the first data packet communication frame 340.

In yet another embodiment at block 514 in which multiple wireless IO device position offset values have been missed due to multiple dropped packet, the wireless communication dongle may estimate the missed wireless IO device position offset value using a single method. For example, the controller of the wireless communication dongle 330 or information handling system 300 executing code instructions of the wireless IO device missed position offset value recovery and compensation system in an embodiment may initiate a smart compensation data frame 340 in which it compensates for missed position offset values (e.g., in dropped packets at 342 and 343) by assuming a constant movement occurred during the time slot in which the wireless communication dongle did not receive the multiple wireless IO device compressed input data packets. In other words, the wireless IO device missed position offset value recovery and compensation system in such embodiments may estimate the missed wireless IO device position offset values (e.g., ($\Delta X_2$, $\Delta Y_2$) and ($\Delta X_3$, $\Delta Y_3$)) based on the wireless IO device position offset values (e.g., ($\Delta X_1$, $\Delta Y_1$) or ($\Delta X_4$, $\Delta Y_4$)) from wireless IO device compressed input data packets (e.g., 341 or 344) received either before or after the dropped packet (e.g., 342 or 343). The method may then proceed to block 518 to regenerate wireless IO device input positional values for cursor movement in HID reporting format from compressed positional offset values received in the wireless IO device compressed data packets.

In an embodiment in which each of the wireless IO device compressed input data packets (e.g., 342-344) also contain an initial positional measurement and a position offset value, the controller of the wireless communication dongle 330 or information handling system 300 executing code instructions of the wireless IO device missed position offset value recovery and compensation system in an embodiment may estimate the initial positional measurement within the dropped packets as well. For example, upon determining a position offset value using any of the methods described above with respect to block 414, the controller of the wireless communication dongle 330 or information handling system 300 executing code instructions of the wireless IO device missed position offset value recovery and compensation system in an embodiment may determine the initial positional measurement within a dropped packet as the adjusted positional measurement determined for the previous packet. More specifically, in an embodiment in which the second wireless IO device compressed input data packet 342 containing an initial position (e.g., $X_1$, $Y_1$) is dropped, the controller of the wireless communication dongle 330 or information handling system 300 executing code instructions of the wireless IO device missed position offset value recovery and compensation system in an embodiment may determine the initial position (e.g., $X_1$, $Y_1$) is equivalent to the adjusted positional measurement (e.g., $X_1$, $Y_1$) determined based on the positional information (e.g., $X_0$, $Y_0$, $\Delta X_1$, $\Delta Y_1$) given within the first wireless IO device compressed input data packet 341.

The wireless communication dongle in an embodiment at block 516 may transmit all missed position offset values from all dropped packets in the first wireless IO device compressed input data packet payload within an already scheduled second data packet communication frame. Because the wireless communication dongle in an embodiment estimates the position offset value measured at the wireless IO device during transmission of the updated polling packet 370, additional missing position offset values due to all dropped data packets in the first data packet communication frame poses an increased risk of erroneous estimation of the position of the cursor prior to receipt of the fifth wireless IO device compressed input data packet 391 in the second data packet communication frame 390. Thus, when all data packets in the first data packet communication frame 340 are dropped, the wireless IO device 380 may transmit those missed position offset values from all dropped packets along with current positional information within the next, second data packet communication frame.

For example, in an embodiment in which the fourth wireless IO device compressed input data packet 344 is dropped, in combination with the first, second, or third wireless IO device compressed input data packets 341, 342, or 343, respectively, the updated polling packet 370 may instruct the wireless IO device 380 to transmit these missing wireless IO device position offset values in the next, second data packet frame 390. The method may then proceed to block 518 to regenerate wireless IO device input positional values for cursor movement in HID reporting format from compressed positional offset values received in the wireless IO device compressed data packets for providing to the OS of the information handling system.

At block 520, the wireless communication dongle may estimate the wireless IO device position offset value likely to occur for a missing or dropped data packet in a received data packet communication frame when error is detected during smart compensation mode. Once all of the positional offset values are received or estimated if missing, and then the wireless communication dongle will regenerate wireless IO device input positional values for cursor movement in HID reporting format from the compressed positional offset values received in the wireless IO device compressed data packets. The HID reporting format wireless IO device input positional values are then provided to the OS and wireless IO device drivers of the information handling system to be reflected as cursor movement on a display screen. The method may proceed to block 520.

At block 520, the missed position offset value recovery and compensation system may determine if the wireless IO device or wireless communication dongle have been turned off or entered a sleep state mode. If so, then the method may end. If the wireless IO device or wireless communication dongle are still operating to transmit data packet communication frames, then flow returns to block 504 for continuation of smart compensation mode to monitor the received wireless IO device data packet communication frames for errors. In such a way, the wireless IO device missed position offset value recovery and compensation system of embodiments of the present disclosure may compensate for or recover missing wireless IO device position offset values at the wireless communication dongle.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless input/output (IO) device missed position offset value recovery and compensation system of a wireless communication dongle at an information handling system comprising:
    a controller to transmit with a wireless radio system an initial polling packet to instruct an operatively connected wireless mouse to transmit a selected number of wireless mouse compressed input data packets within allotted time slots of a first data packet communication frame wherein the selected number of wireless mouse compressed input data packets includes a two byte payload of wireless mouse position offset values;
    the wireless radio system of the wireless communication dongle to receive within the first data packet communication frame a missing data packet among the selected number of wireless mouse compressed input data packets;
    the controller to execute code instructions of the wireless IO device missed position offset value recovery and compensation system to translate the wireless mouse position offset values in the selected number of wireless mouse compressed input data packets into cursor positional data for a cursor displayed via an operatively connected digital display;
    the controller to generate estimated cursor positional data for the missing data packet based on estimated wireless IO device position offset values estimated from wireless mouse position offset values received in other allotted time slots of the first data packet communication frame; and
    the controller to generate a human interface device (HID) report that includes the cursor positional data and the estimated cursor positional data for processing by a processor of the information handling system executing code instructions of an operating system (OS).

2. The wireless IO device missed position offset value recovery and compensation system of the wireless communication dongle of claim 1, wherein the first data packet communication frame has a first data packet including an initial wireless mouse position value in a six byte format from which the wireless mouse position offset values are determined.

3. The wireless IO device missed position offset value recovery and compensation system of the wireless communication dongle of claim 1 further comprising:
    the controller to identify a frequency of dropped packets that meets a data packet error frequency threshold value; and
    the wireless radio system to transmit a second, updated polling packet instructing the wireless mouse to transmit future data packet communication frames using an adjusted frequency hopping table.

4. The wireless IO device missed position offset value recovery and compensation system of the wireless communication dongle of claim 1 further comprising:
    the controller to generate estimated cursor positional data for the missing data packet from estimating the wireless mouse position offset value equivalent to a wireless mouse position offset value from a payload received during the allotted time slot of the first data packet communication frame immediately preceding the missing data packet.

5. The wireless IO device missed position offset value recovery and compensation system of the wireless communication dongle of claim 1 further comprising:
    the controller to generate plural estimated cursor positional data for plural missing data packets from estimating wireless mouse position offset values equivalent to wireless mouse position offset values from a payload received during an allotted time slot of the first data packet communication frame immediately preceding the plurality of missing data packets.

6. The wireless IO device missed position offset value recovery and compensation system of the wireless communication dongle of claim 1 further comprising:
    the controller to generate estimated cursor positional data for the missing data packet from estimating the wireless mouse position offset value equivalent to an average of wireless mouse position offset values from a plurality of payloads received during the plurality of allotted time slots of the first data packet communication frame immediately preceding the missing data packet.

7. The wireless IO device missed position offset value recovery and compensation system of the wireless communication dongle of claim 1 further comprising:
    the controller to generate estimated cursor positional data for the missing data packet from estimating the wireless mouse position offset value equivalent to one pixel of movement in an estimated wireless mouse position offset change direction that matches a wireless mouse position offset change direction from a payload received during an allotted time slot of the first data packet communication frame immediately preceding the allotted time slot associated with the missing data packet.

8. A method of wireless input/output (IO) device missed position offset value recovery and compensation comprising:
 transmitting, via a controller of a wireless communication dongle with a wireless radio system, an initial polling packet to instruct an operatively connected wireless IO device to transmit a selected number of wireless IO device compressed input data packets of an initial data packet length within allotted time slots of a first data packet communication frame, wherein the selected number of wireless IO device compressed input data packets includes a two byte payload of wireless IO device position offset values;
 generating, via the controller, estimated wireless IO device position offset values estimated from wireless IO device position offset values received in other allotted time slots of the first data packet communication frame;
 transmitting, via the wireless radio system a second, updated polling packet identifying one or more dropped packets identified via the controller in the first data packet communication frame;
 receiving, via the wireless radio system, a first data packet in a second data packet communication frame including a two byte payload of continued wireless IO device position offset values that continues the wireless IO device position offset values from those previously transmitted in the first data packet communication frame; and
 generating, via the controller, a human interface device (HID) report that includes cursor positional data generated from the wireless IO device position offset values and at least one estimated wireless IO device position offset value for processing by a processor of the information handling system executing code instructions of an operating system (OS).

9. The method of claim 8, wherein the first data packet communication frame has a first data packet including an initial wireless IO device position value in a six byte format from which the wireless mouse position offset values are determined.

10. The method of claim 8 further comprising:
 determining, via the controller, a frequency of dropped packets meets a data packet error threshold value; and
 transmitting, via the wireless radio system, a second, updated polling packet instructing the wireless IO device to transmit future data packet communication frames using an adjusted frequency hopping table.

11. The method of claim 8 further comprising:
 determining, via the controller, a frequency of dropped packets meets a data packet error threshold value; and
 transmitting, via the wireless radio system, a second, updated polling packet instructing the wireless IO device to transmit wireless IO device compressed input data packets having an adjusted data packet length in future data packet communication frames using an adjusted frequency hopping table.

12. The method of claim 8 further comprising:
 determining, via the controller, that a number of dropped packets over a number of data packet communication frames following the second data packet communication frame falls below a dongle smart compensation threshold value;
 wherein each of the number of dropped packets includes a missed payload; and
 exiting, via the controller, a smart compensation mode to monitor for missing data packets and cease generating estimated wireless IO device position offset values for missing data packets and transmit a request to transmit each of the missed payloads upon determination of missing data packets.

13. The method of claim 8 further comprising:
 generating, via the controller, the estimated wireless IO device position offset value equivalent to one pixel of movement in an estimated wireless IO device position offset change direction that matches a wireless IO device position offset change direction from a payload received during an allotted time slot of the first data packet communication frame immediately preceding the allotted time slot associated with the missing data packet.

14. The method of claim 8 further comprising:
 generating, via the controller, an estimated wireless IO device position offset value equivalent to a wireless IO device position offset value from a payload received during the allotted time slot of the first data packet communication frame immediately preceding the missing data packet.

15. A wireless input/output (IO) device missed position offset value recovery and compensation system of a wireless communication dongle at an information handling system comprising:
 a controller to transmit with a wireless radio system an initial polling packet to instruct an operatively connected wireless IO device to transmit a selected number of wireless IO device compressed input data packets within allotted time slots of a first data packet communication frame using an initial frequency hopping table, wherein the selected number of wireless IO device compressed input data packets includes a two byte payload of wireless IO device position offset values;
 the wireless radio system to transmit a second, updated polling packet identifying a dropped packet occurring prior to the last allotted time slot of the first data packet communication frame;
 the controller to execute code instructions of the wireless IO device dropped data packets recovery and compensation system to translate the wireless IO device position offset values from received payloads into cursor positional data for a cursor displayed via an operatively connected digital display;
 the controller to generate an estimated wireless IO device position offset value for a missing data packet determined from one of the allotted time slots based on wireless IO device position offset values from wireless IO device position offset values in payloads received in other allotted time slots of the first data packet communication frame; and
 the controller to generate a human interface device (HID) report that includes the cursor positional data generated from received wireless IO device position offset values and the estimated wireless IO device positional offset value for processing by a processor of the information handling system executing code instructions of an operating system (OS).

16. The wireless IO device missed position offset value recovery and compensation system of the wireless communication dongle of claim 15 further comprising:
 the controller to determine a frequency of dropped packets that meets a data packet error threshold value; and the wireless radio system to transmit a second, updated polling packet instructing the wireless IO device to transmit future data packet communication frames using an adjusted frequency hopping table.

17. The wireless IO device missed position offset value recovery and compensation system of the wireless communication dongle of claim 15 further comprising:

the controller to determine that a number of dropped packets over a number of data packet communication frames following a second data packet communication frame falls below a dongle smart compensation threshold value;

wherein each of the number of dropped packets includes a missed payload; and the controller ceasing to generate estimated wireless IO device position offset values for missing data packets and transmitting a request to transmit each of the missed payloads upon determination of missing data packets.

18. The wireless IO device missed position offset value recovery and compensation system of the wireless communication dongle of claim 15 further comprising:

the controller to generate the estimated wireless IO device position offset value for the missing data packet equivalent to wireless IO device position offset values from a payload received during an allotted time slot of the first data packet communication frame immediately preceding the allotted time slot associated with the missing data packet.

19. The wireless IO device missed position offset value recovery and compensation system of the wireless communication dongle of claim 15 further comprising:

the controller to generate the estimated wireless IO device position offset value for the missing data packet equivalent to linear progression the received wireless IO device position offset values from a plurality of payloads received during the allotted time slots of the first data packet communication frame immediately before and after the allotted time slot associated with the missing data packet.

20. The wireless IO device missed position offset value recovery and compensation system of the wireless communication dongle of claim 15 further comprising:

the controller to generate the estimated wireless IO device position offset value for the missing data packet equivalent to one pixel of movement in an estimated wireless IO device position offset direction that matches a wireless IO device position offset direction from a payload received during an allotted time slot of the first data packet communication frame immediately preceding the allotted time slot associated with the missing data packet.

* * * * *